US012776837B2

(12) United States Patent
Ahn et al.

(10) Patent No.: US 12,776,837 B2
(45) Date of Patent: Oct. 27, 2026

(54) DEVICE AND METHOD FOR PERFORMING QUANTUM SECURE DIRECT COMMUNICATION WITH REDUCED COMPLEXITY IN QUANTUM COMMUNICATION SYSTEM

(71) Applicant: LG ELECTRONICS INC., Seoul (KR)

(72) Inventors: Byungkyu Ahn, Seoul (KR); Sangrim Lee, Seoul (KR); Hojae Lee, Seoul (KR); JaYeong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 215 days.

(21) Appl. No.: 18/715,054

(22) PCT Filed: Nov. 29, 2022

(86) PCT No.: PCT/KR2022/019111
§ 371 (c)(1),
(2) Date: May 30, 2024

(87) PCT Pub. No.: WO2023/101371
PCT Pub. Date: Jun. 8, 2023

(65) Prior Publication Data

US 2025/0038846 A1 Jan. 30, 2025

(30) Foreign Application Priority Data

Dec. 1, 2021 (KR) ........................ 10-2021-0170225

(51) Int. Cl.
*H04B 10/079* (2013.01)
*H04B 10/70* (2013.01)
*H04L 9/08* (2006.01)

(52) U.S. Cl.
CPC ....... *H04B 10/07953* (2013.01); *H04B 10/70* (2013.01); *H04L 9/0858* (2013.01)

(58) Field of Classification Search
CPC .. H04B 10/70; H04B 10/07953; H04L 9/0858
(Continued)

(56) References Cited

U.S. PATENT DOCUMENTS

| | | | | |
|---|---|---|---|---|
| 9,946,973 | B2 * | 4/2018 | Biercuk ................. | B82Y 10/00 |
| 11,804,908 | B2 * | 10/2023 | Kaliteevskiy .......... | H04B 10/70 |

(Continued)

FOREIGN PATENT DOCUMENTS

| | | | | | |
|---|---|---|---|---|---|
| CN | 113726516 | A | * 11/2021 | ........... | H04L 9/0858 |
| CN | 114665978 | B | * 8/2023 | ............. | H04B 10/85 |

OTHER PUBLICATIONS

Yang et al; Quantum secure direct communication with entanglement source and single-photon measurement; Aug. 2020; State Key Laboratory of low dimensional quantum physics and Department of Physics, Tsinghua University, Beijing China, pp. 1-8. (Year: 2020).*

(Continued)

*Primary Examiner* — Amritbir K Sandhu
(74) *Attorney, Agent, or Firm* — LEE, HONG, DEGERMAN, KANG & WAIMEY

(57) ABSTRACT

The present disclosure relates to a quantum communication system. Particularly, the present disclosure relates to a device and a method for performing two-step quantum secure direct communication (QSDC) with a reduced complexity without measuring a quantum memory and a bell state of a receiver in a quantum communication system.

15 Claims, 38 Drawing Sheets

(58) Field of Classification Search
USPC ............................................................ 398/40
See application file for complete search history.

(56) References Cited

U.S. PATENT DOCUMENTS

| | | | | |
|---|---|---|---|---|
| 11,962,353 | B2 * | 4/2024 | Vacon | G01S 7/4865 |
| 12,283,998 | B2 * | 4/2025 | Brodsky | H04B 10/70 |
| 2019/0238326 | A1 | 8/2019 | Ji et al. | |
| 2024/0267133 | A1 * | 8/2024 | Ahn | H04B 10/70 |
| 2025/0038846 | A1 * | 1/2025 | Ahn | H04B 10/85 |

OTHER PUBLICATIONS

Zhen et al; Design and Implementation of A Practical Quantum Secure Direct Communication System; 2018; IEEE, pp. 1-6. (Year: 2018).*

PCT International Application No. PCT/KR2022/019111, International Search Report dated Mar. 15, 2023, 3 pages.

Yang et al., “Quantum secure direct communication with entanglement source and single-photon measurement,” Science China Physics, Mechanics & Astronomy, vol. 63, No. 11: 110311, Aug. 2020, 8 pages.

Yang, “A Quantum Secure Direct Communication Protocol Without Quantum Memories,” International Journal of Theoretical Physics, vol. 53, Feb. 2014, 6 pages.

Sun et al., “Towards Practical Quantum Secure Direct Communication: A Quantum-Memory-Free Protocol and Code Design,” IEEE Transactions on Communications, vol. 68, Issue: 9, Jul. 2020, 15 pages.

Zisu, “Quantum High Secure Direct Communication with Authentication,” 2020 13th International Conference on Communications, Jul. 2020, 4 pages.

* cited by examiner

[FIG. 1]
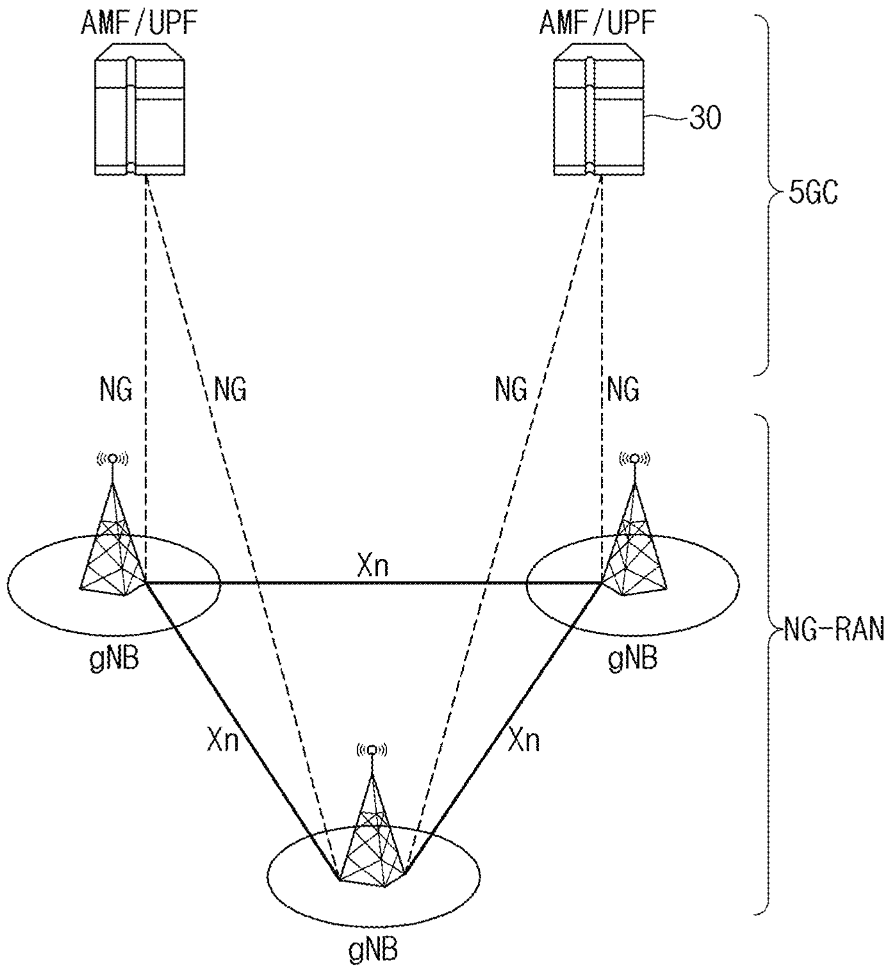

[FIG. 2]
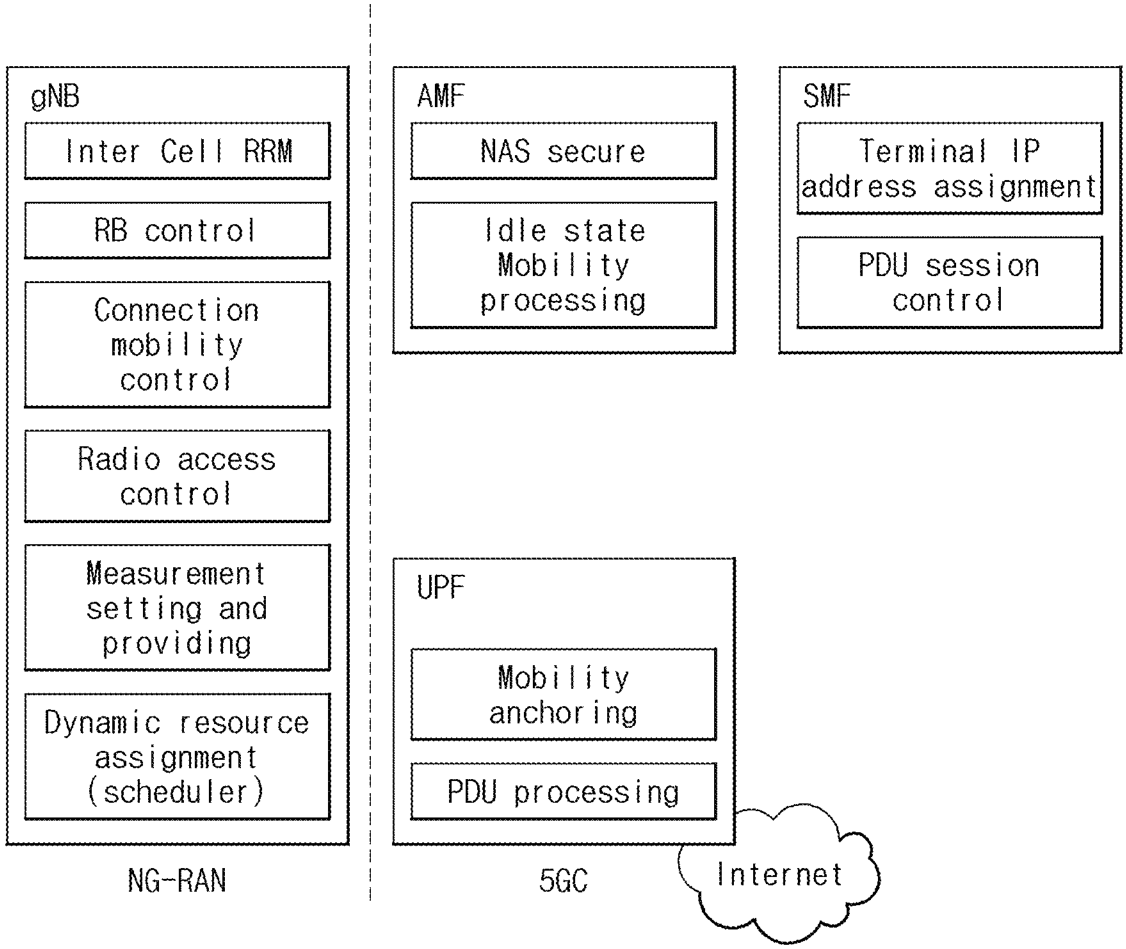

[FIG. 3]
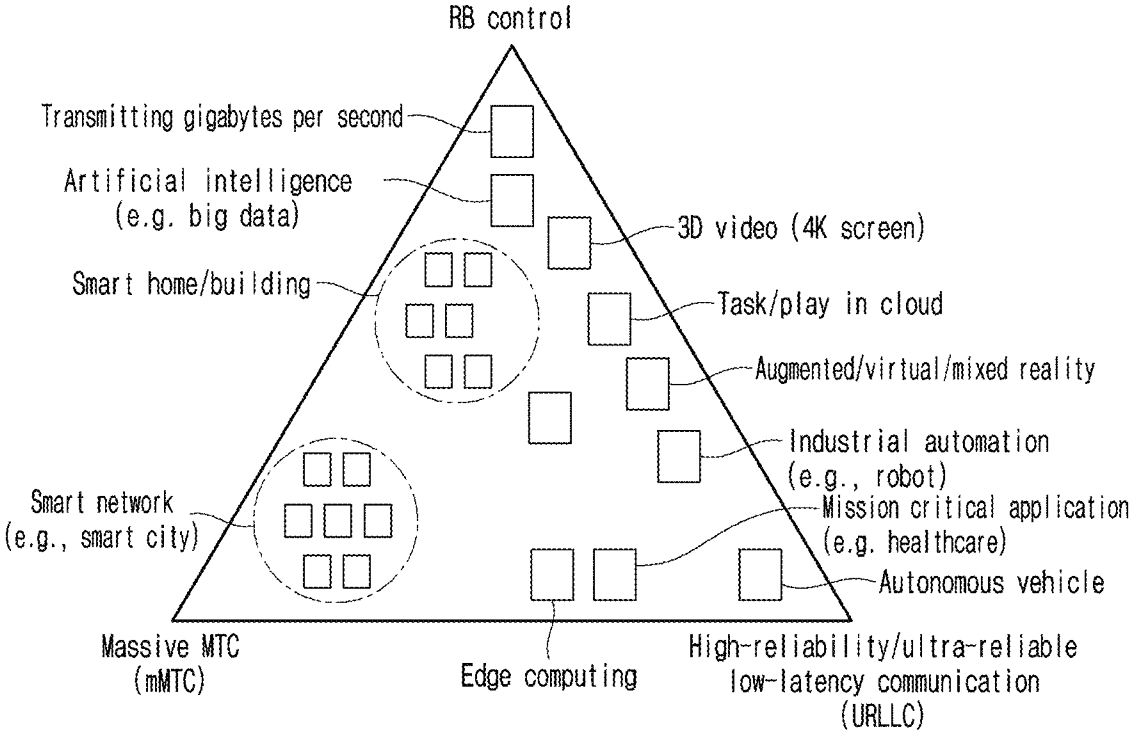

[FIG. 4]
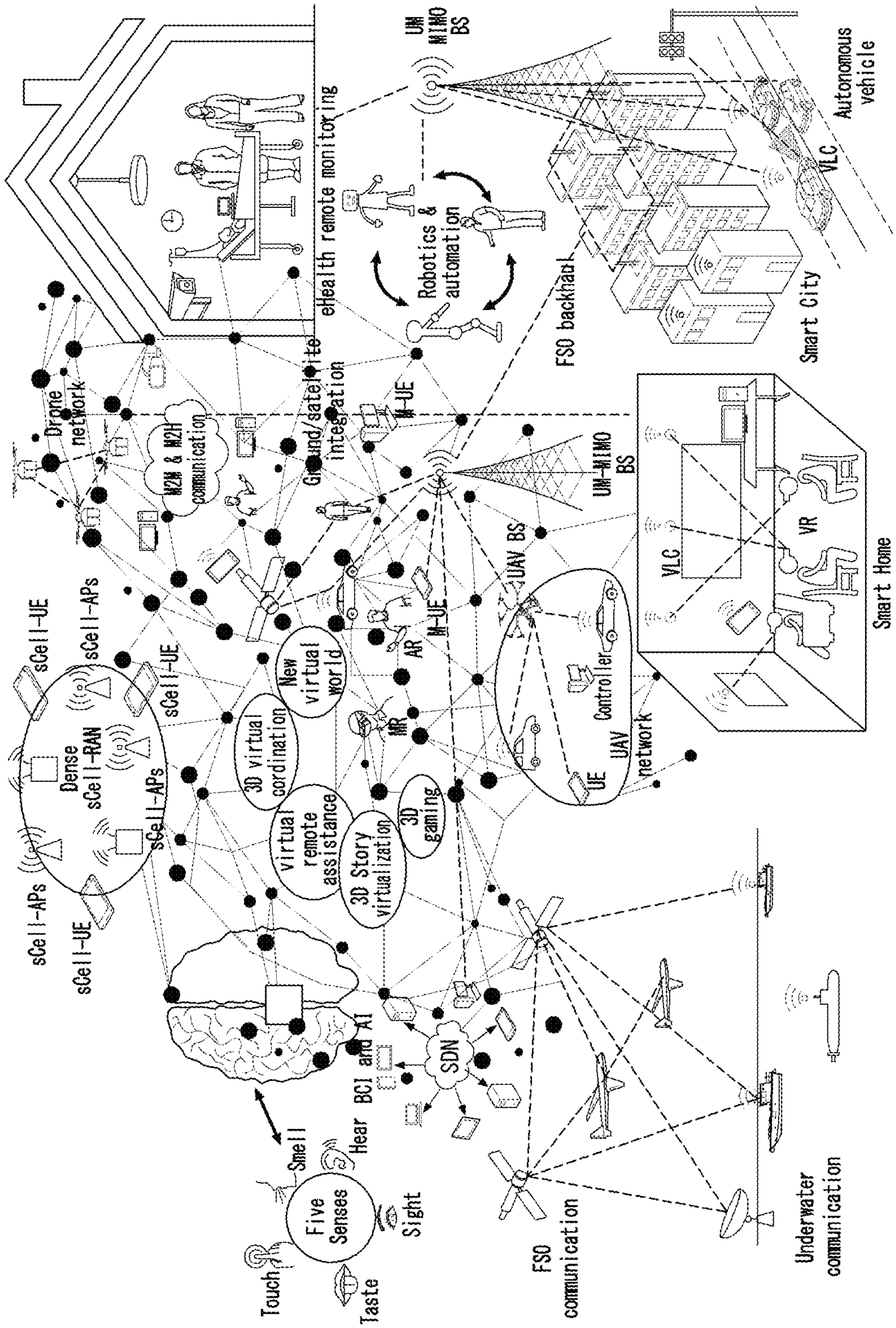

[FIG. 5]
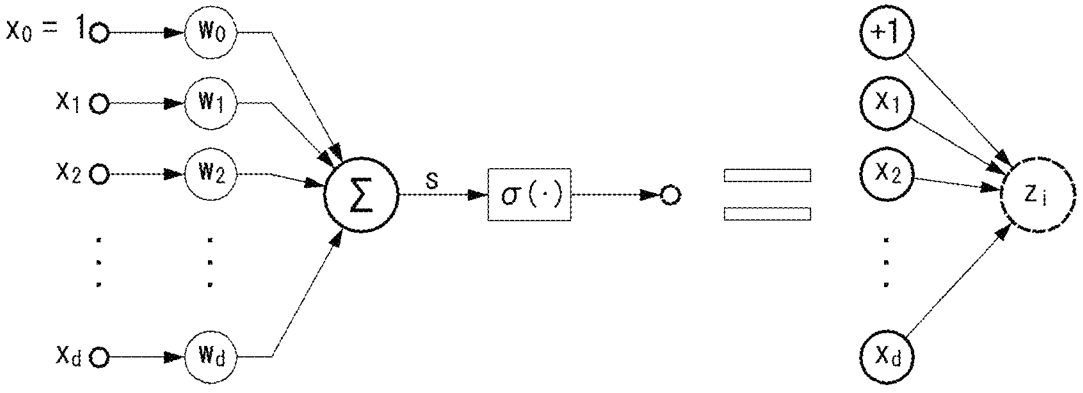

[FIG. 6]
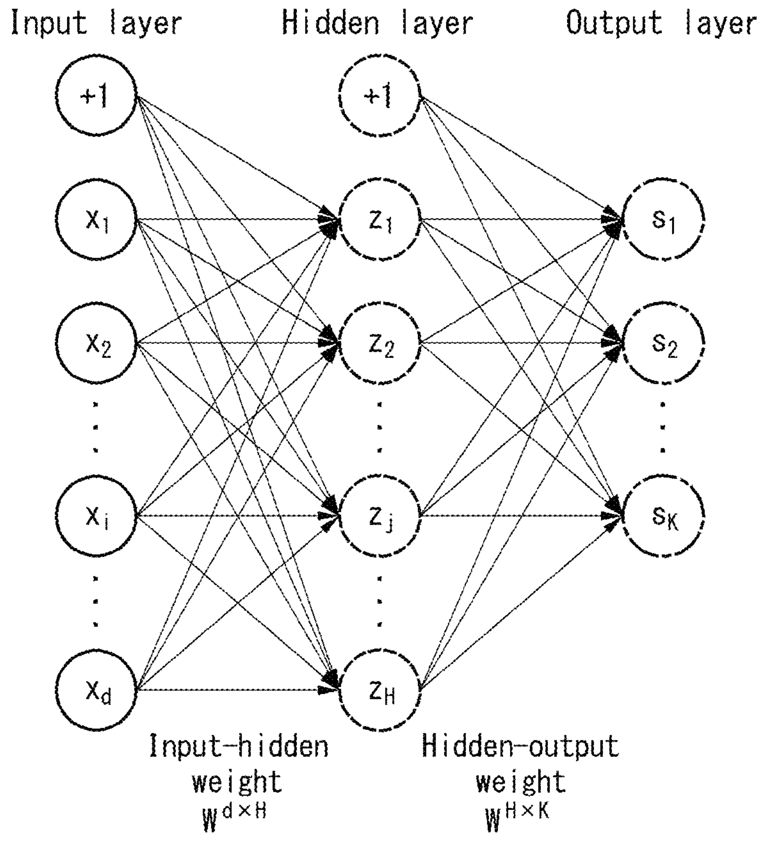

[FIG. 7]
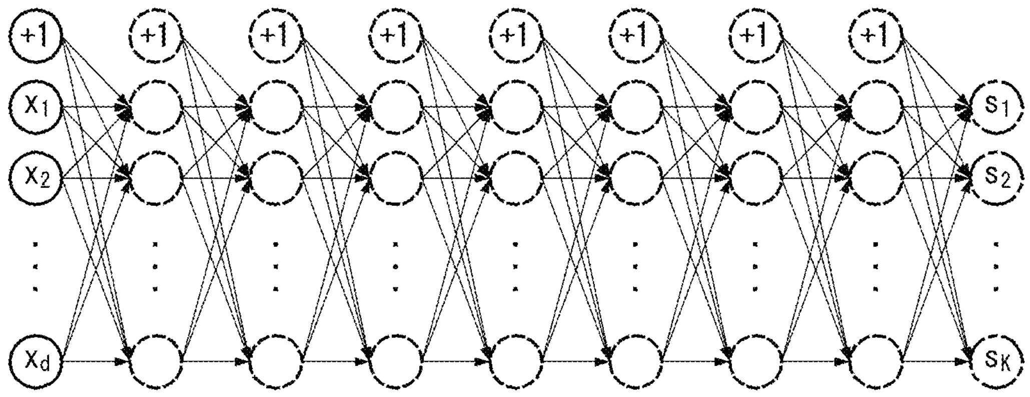

[FIG. 8]
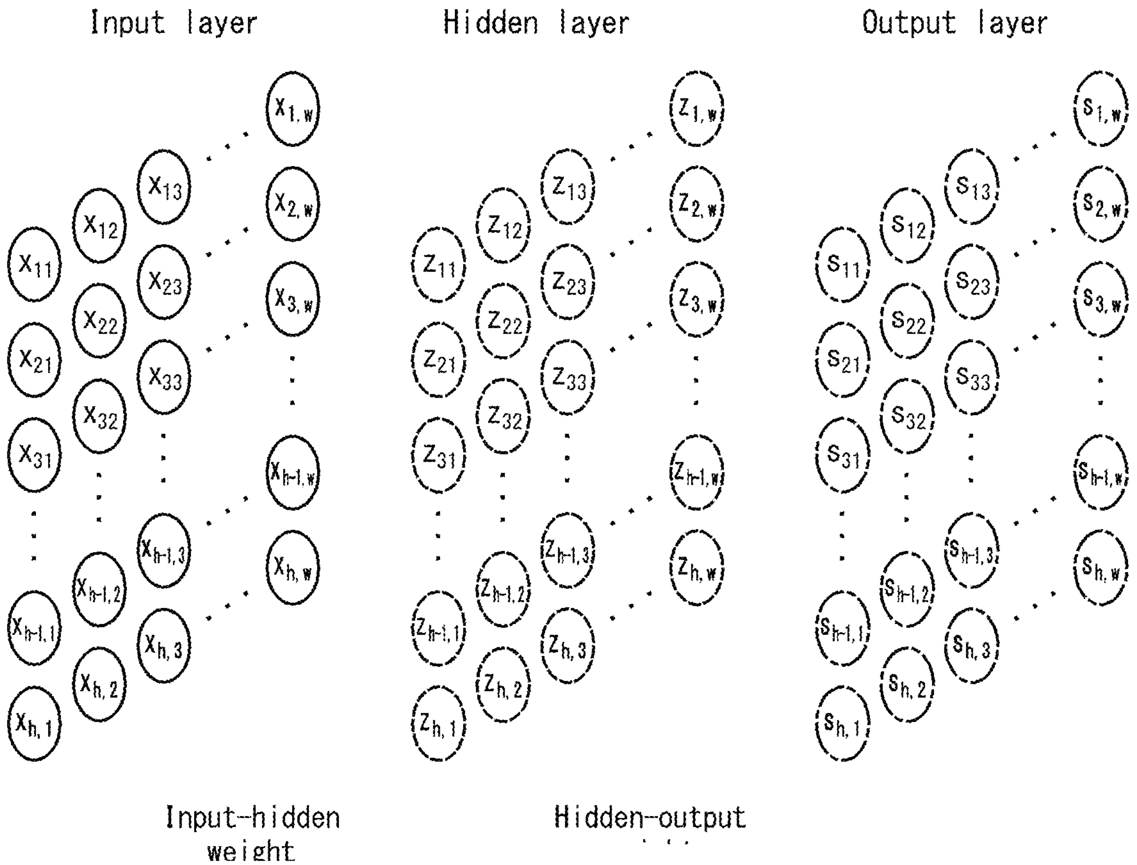

[FIG. 9]
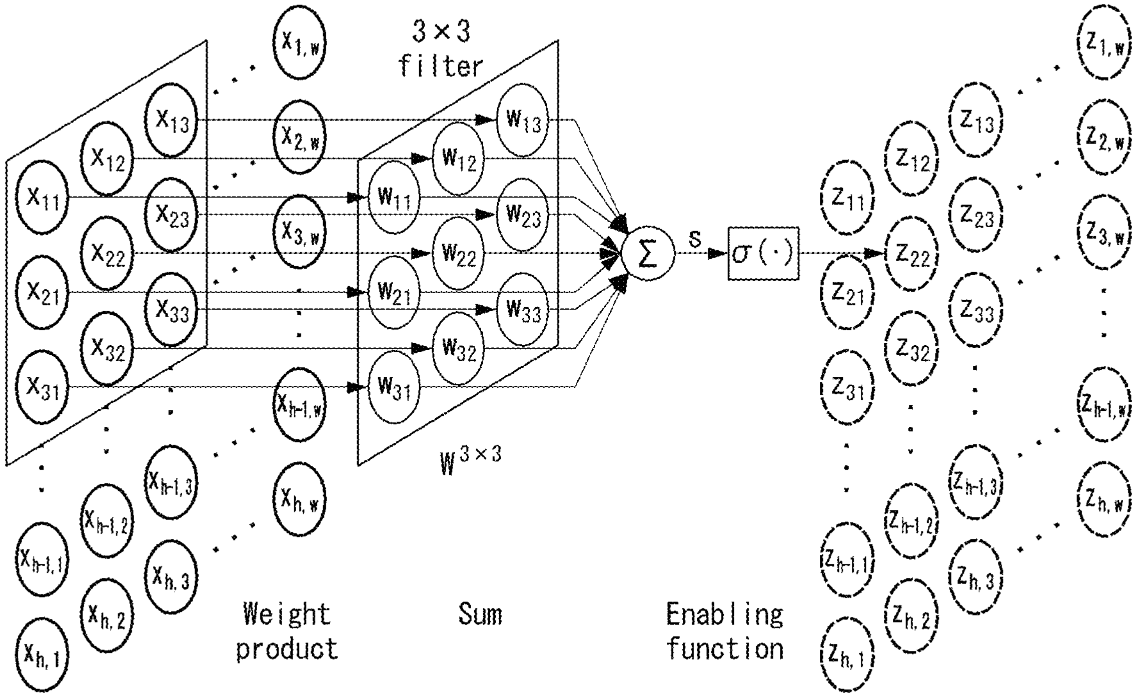

[FIG. 10]
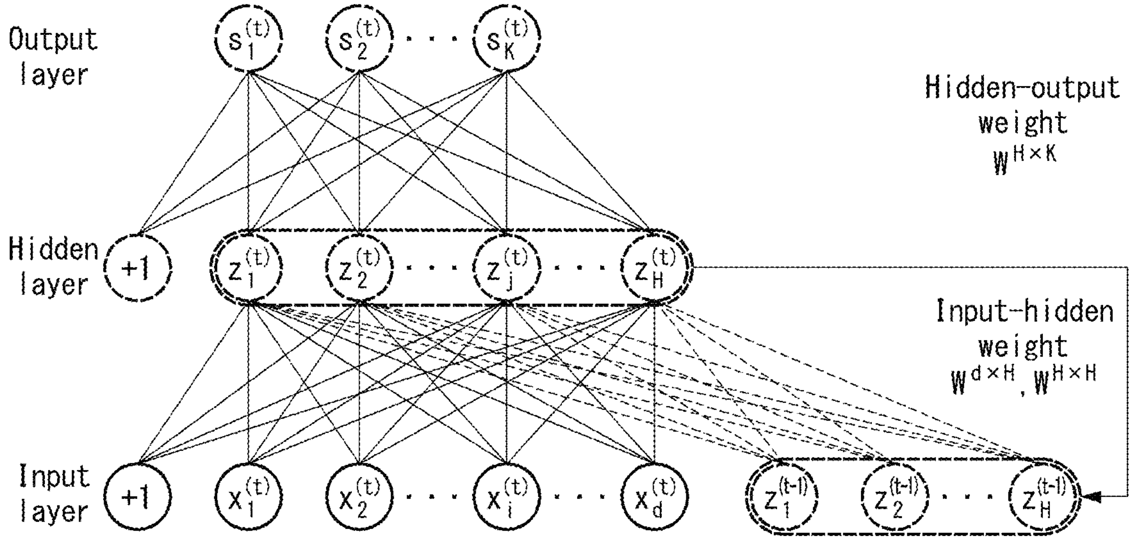

[FIG. 11]
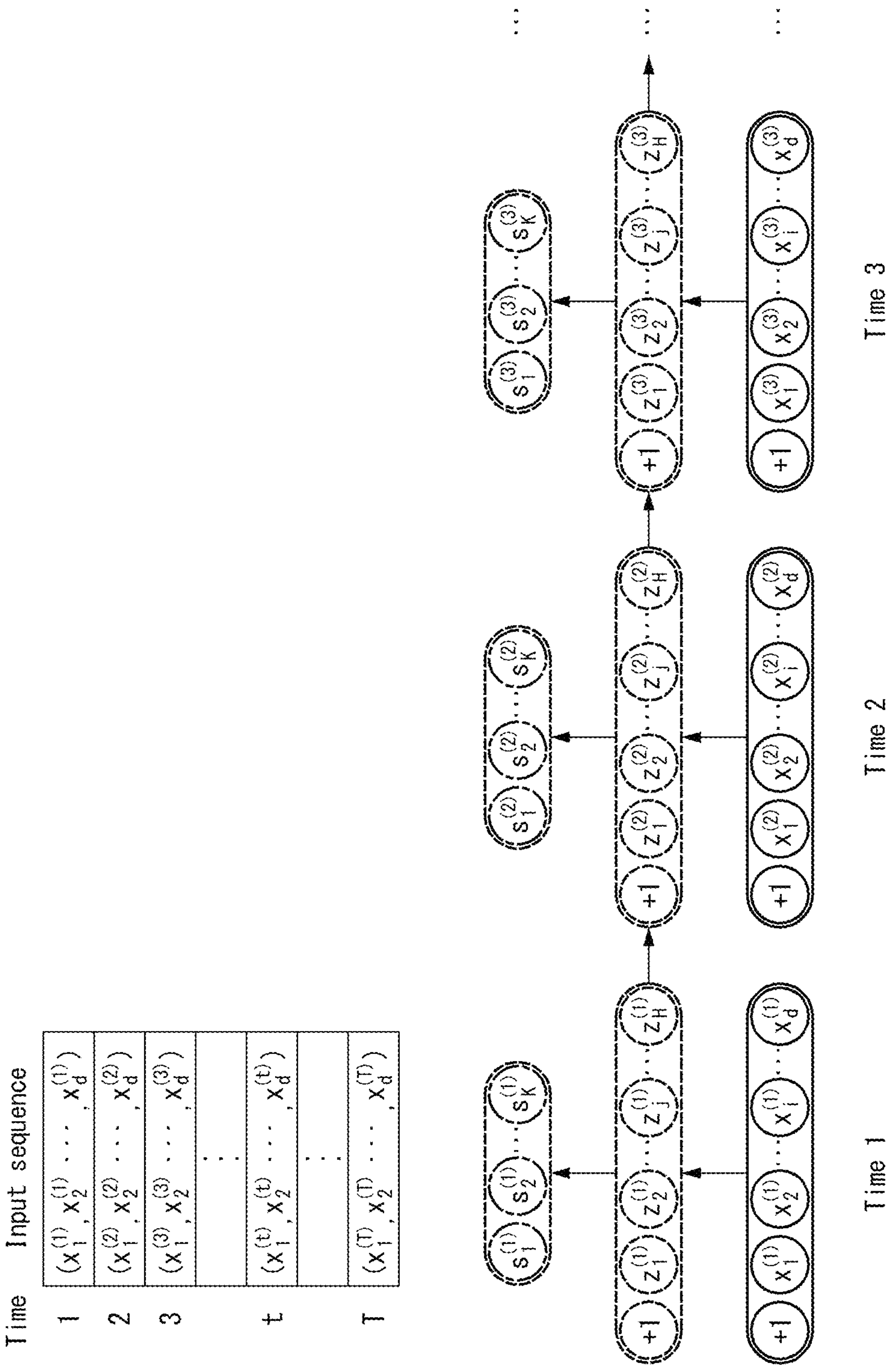

[FIG. 12]
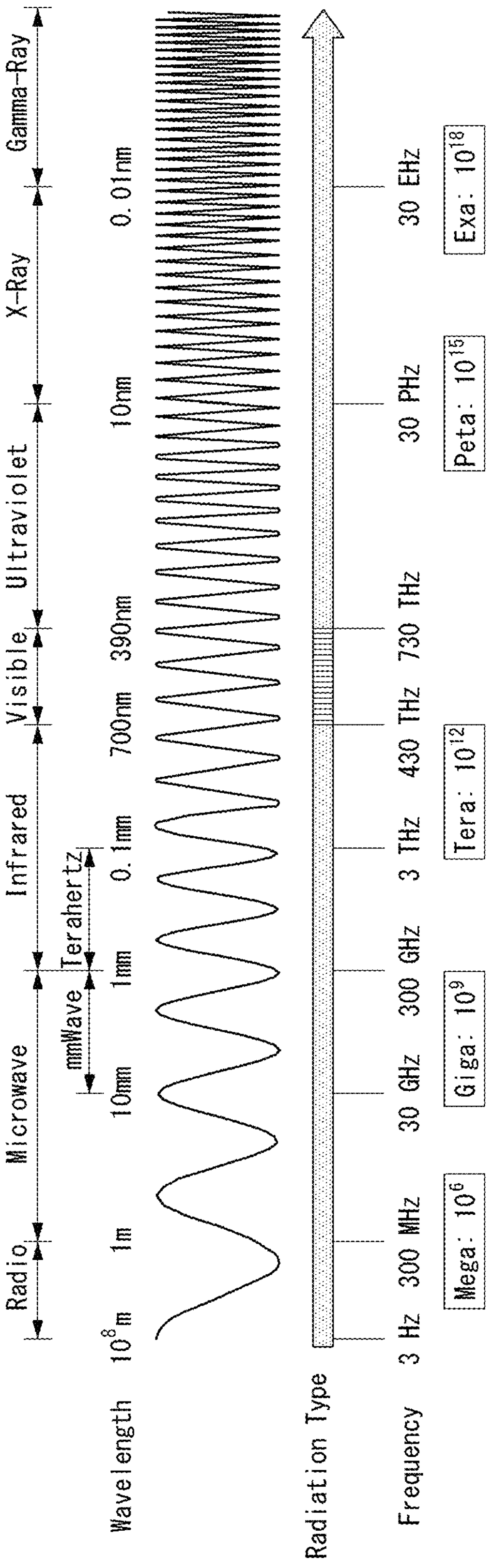

[FIG. 13]
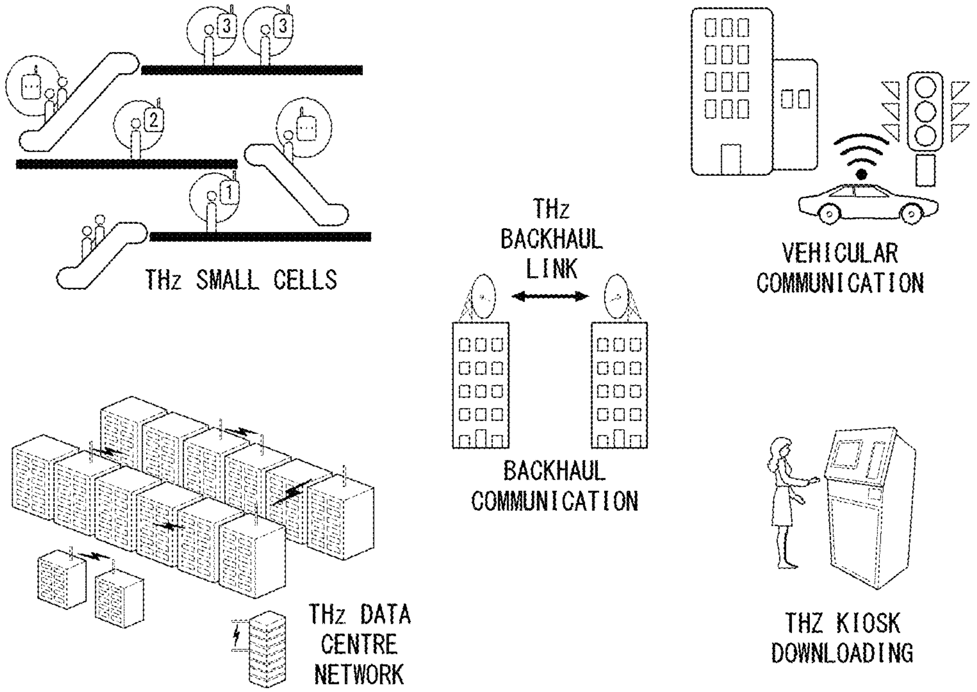

[FIG. 14]
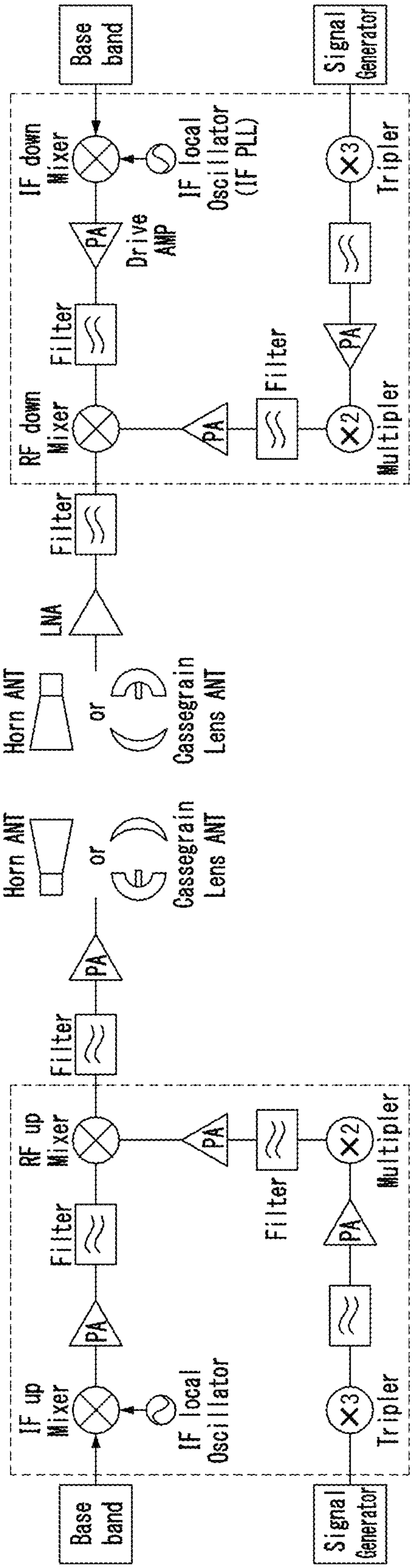

[FIG. 15]
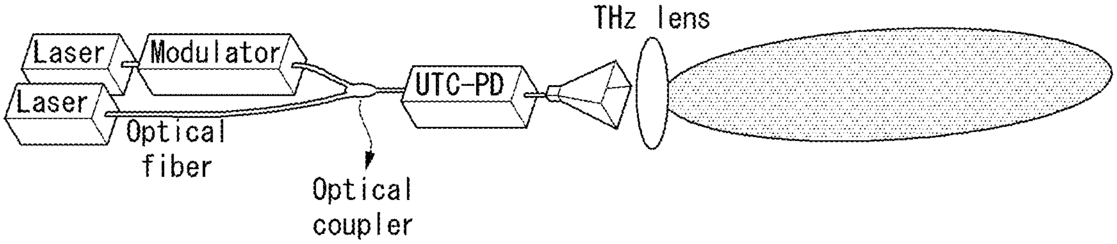

[FIG. 16]
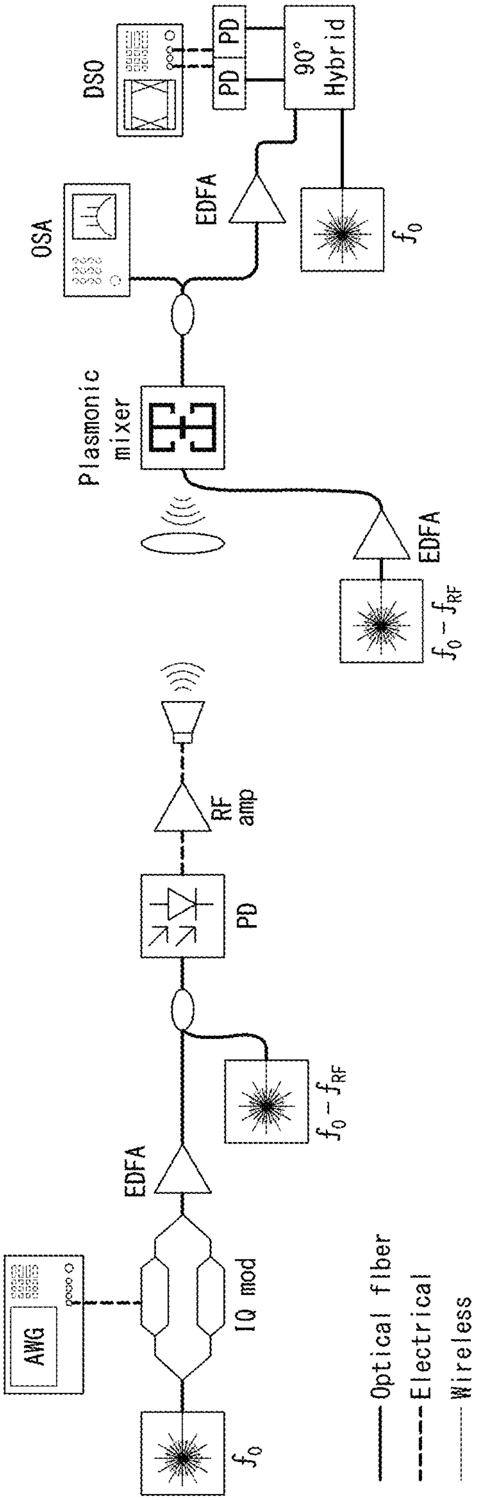

[FIG. 17]
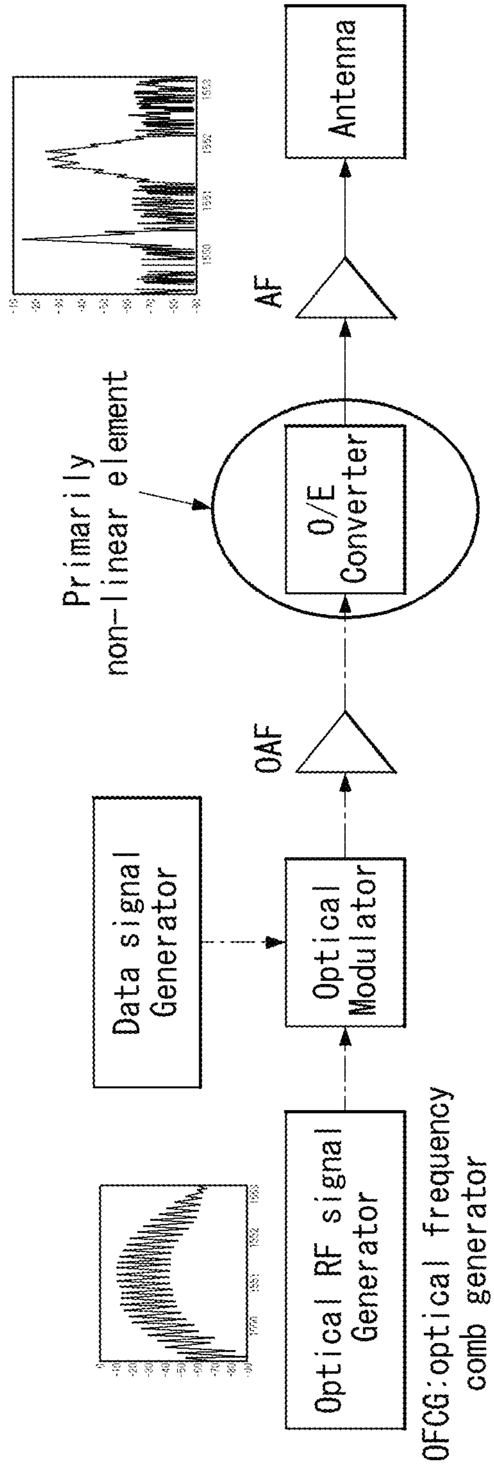

[FIG. 18]
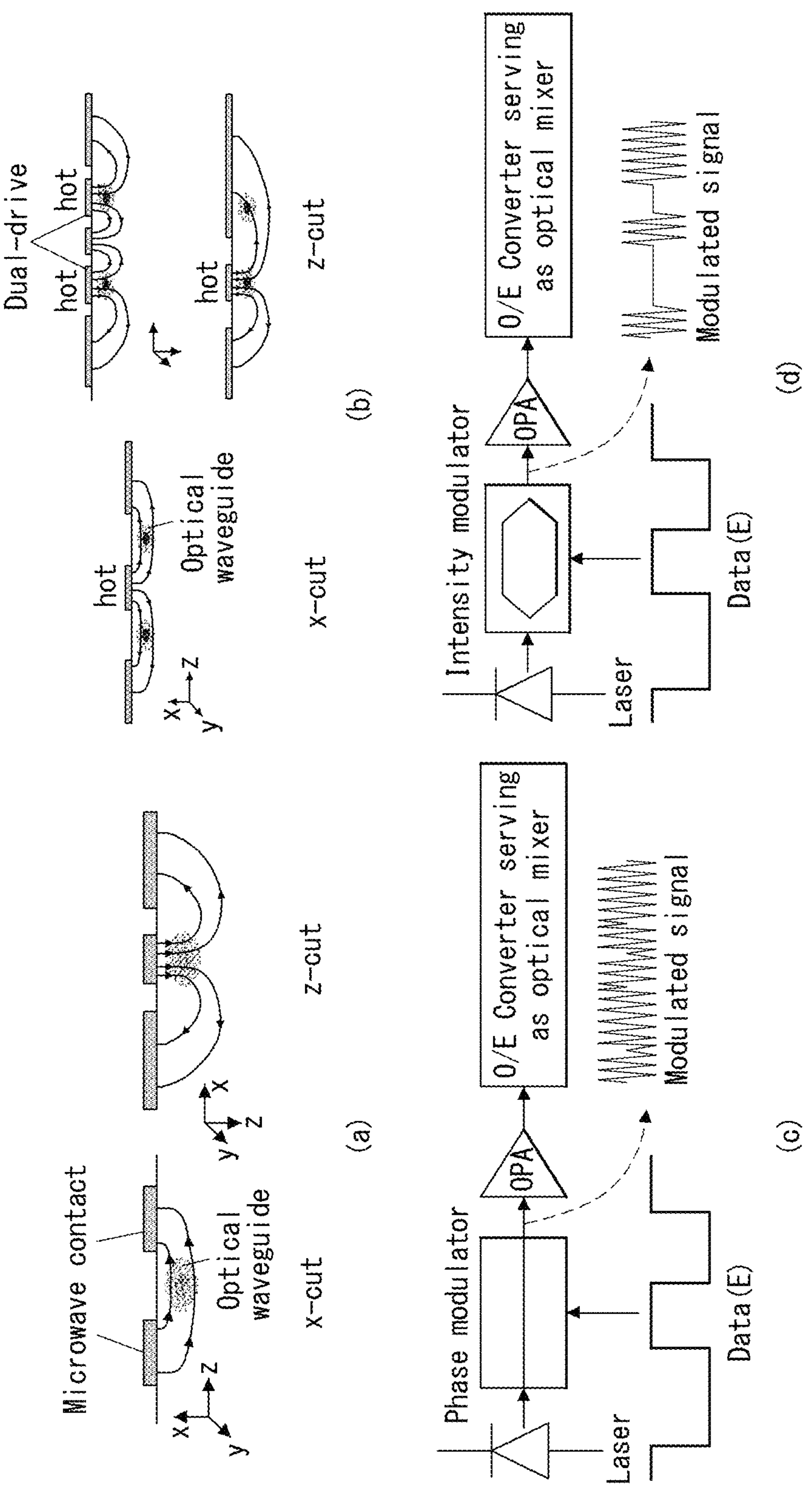

[FIG. 19]
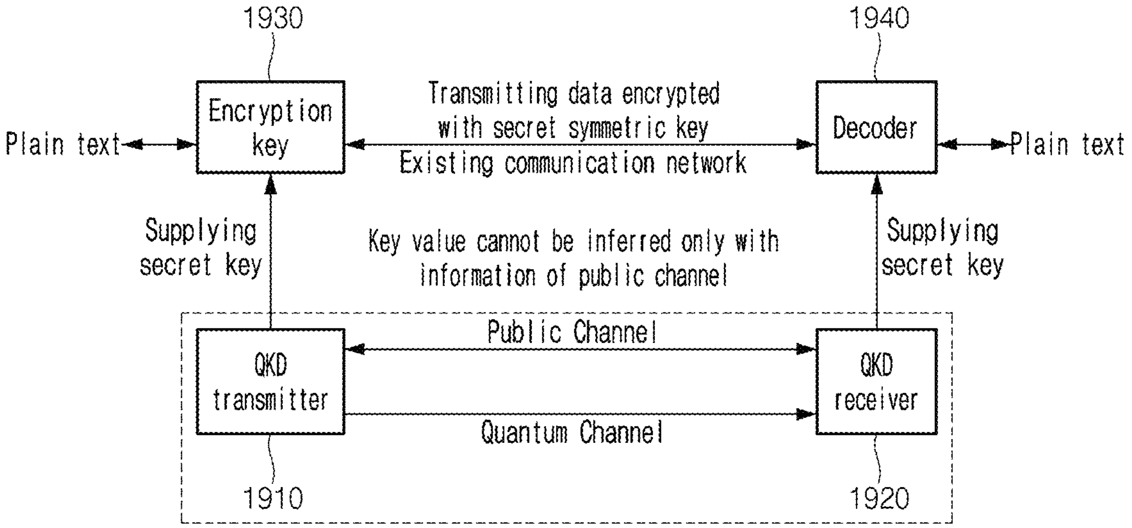

[FIG. 20]
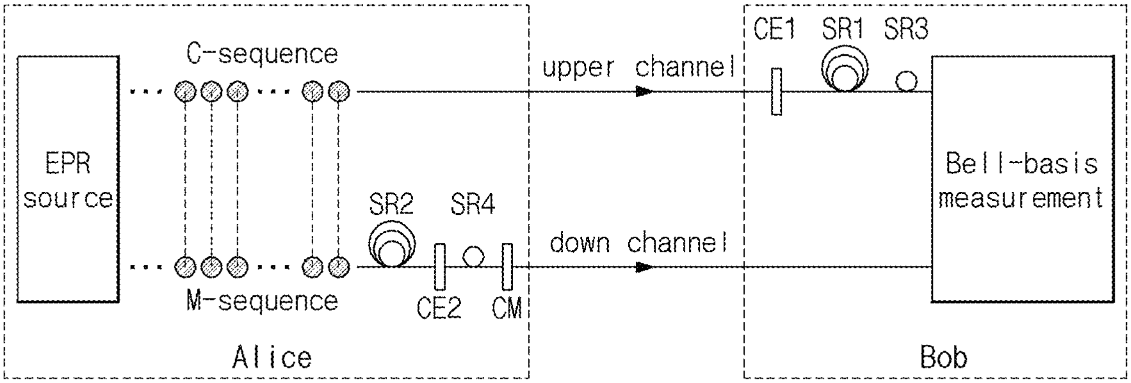

[FIG. 21]
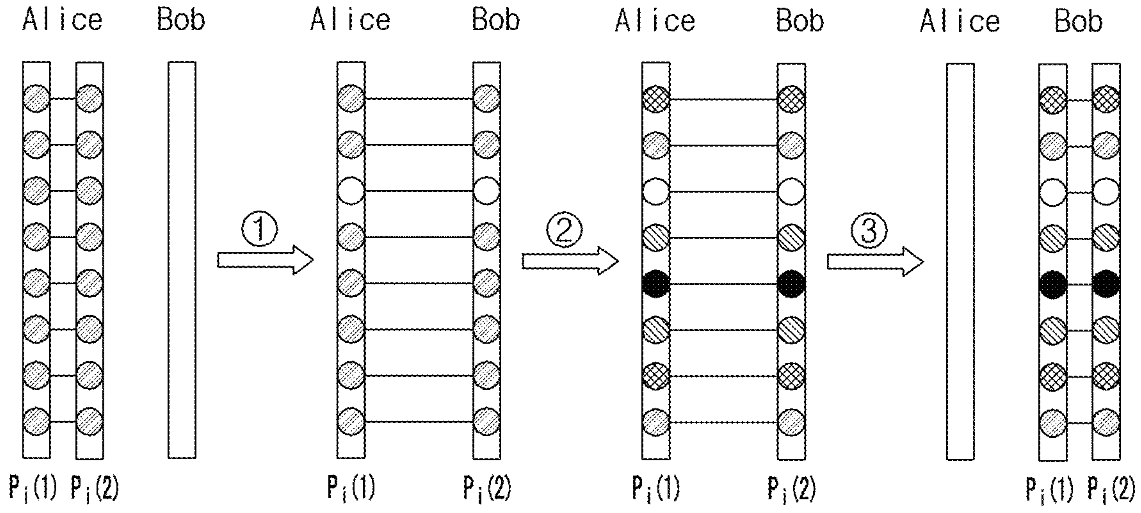

[FIG. 22]
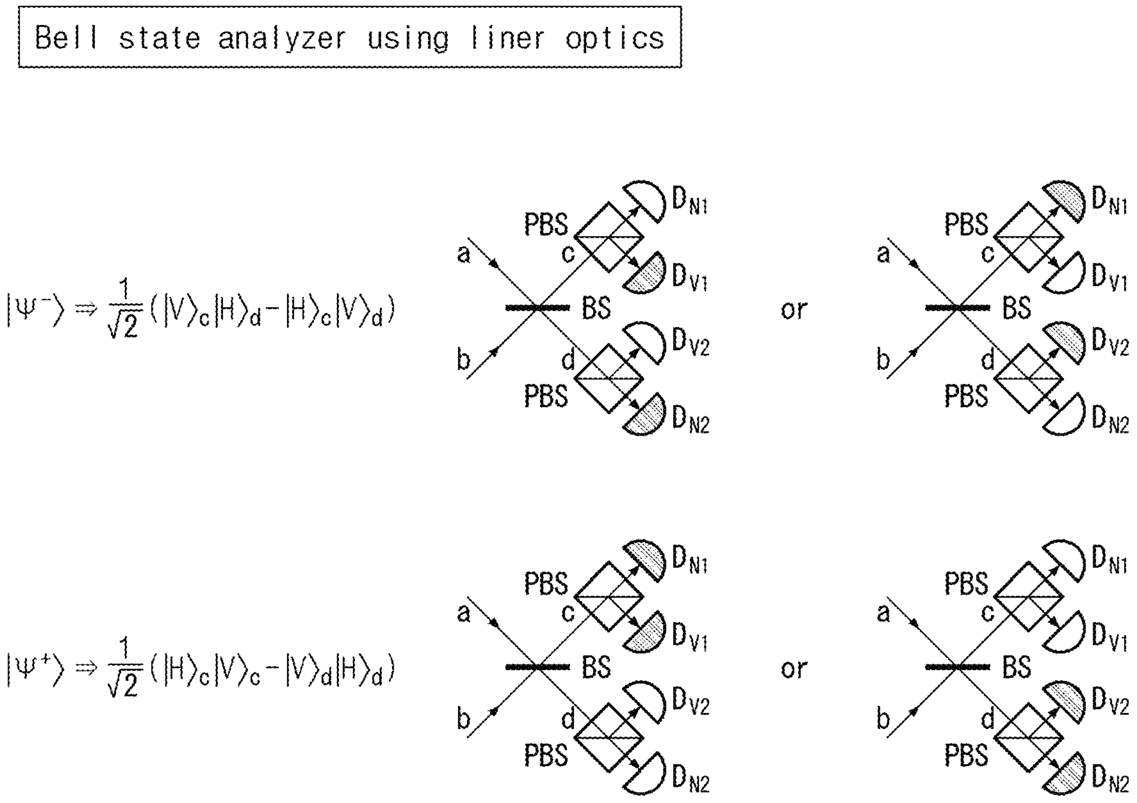

[FIG. 23]
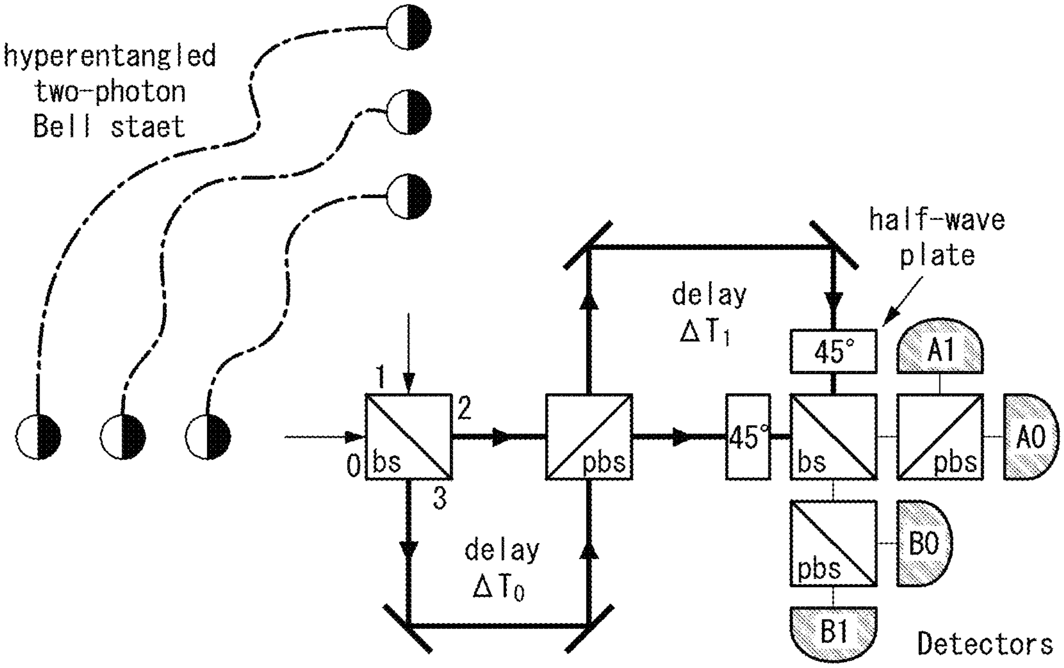

[FIG. 24]
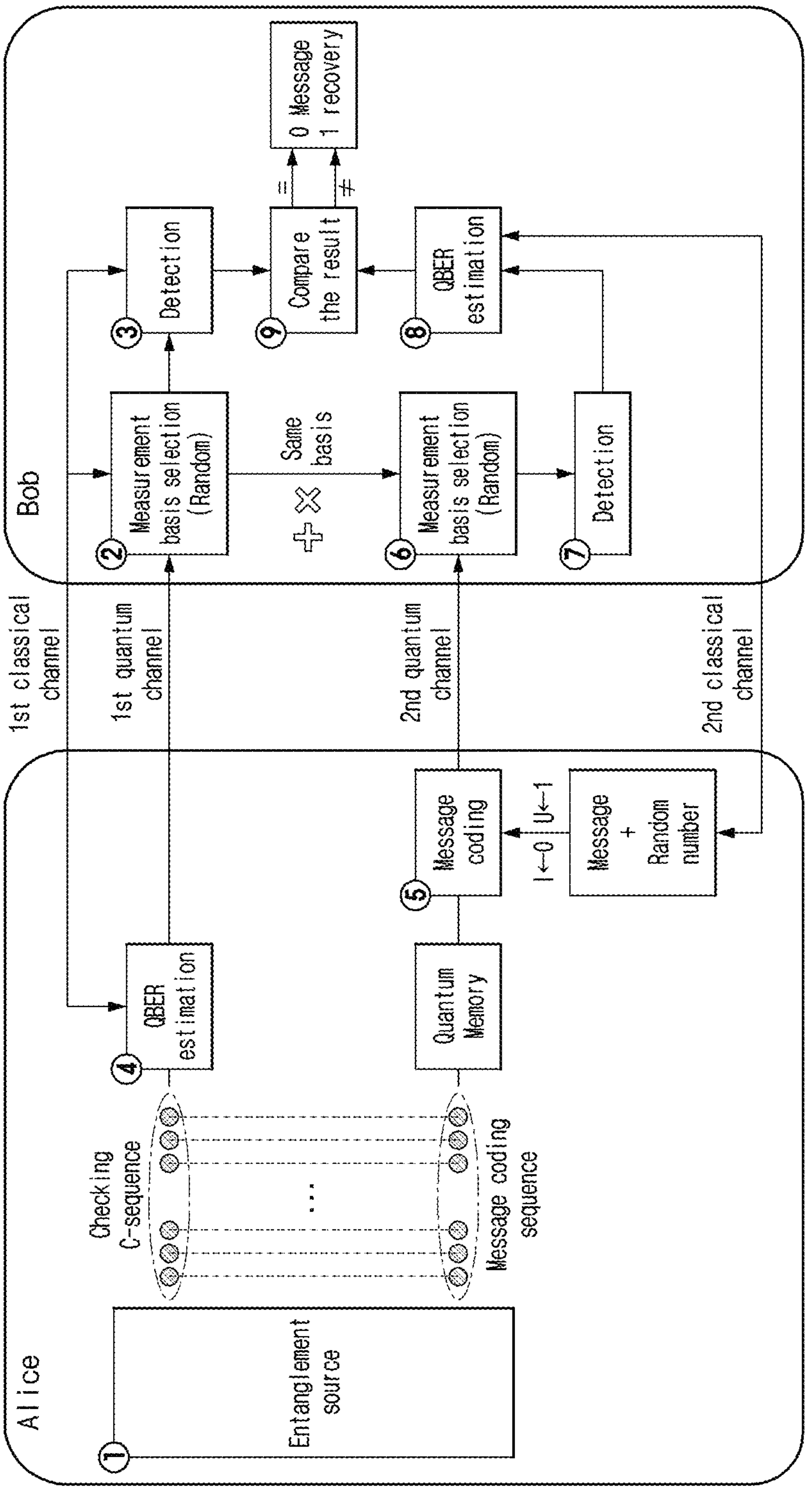

[FIG. 25]
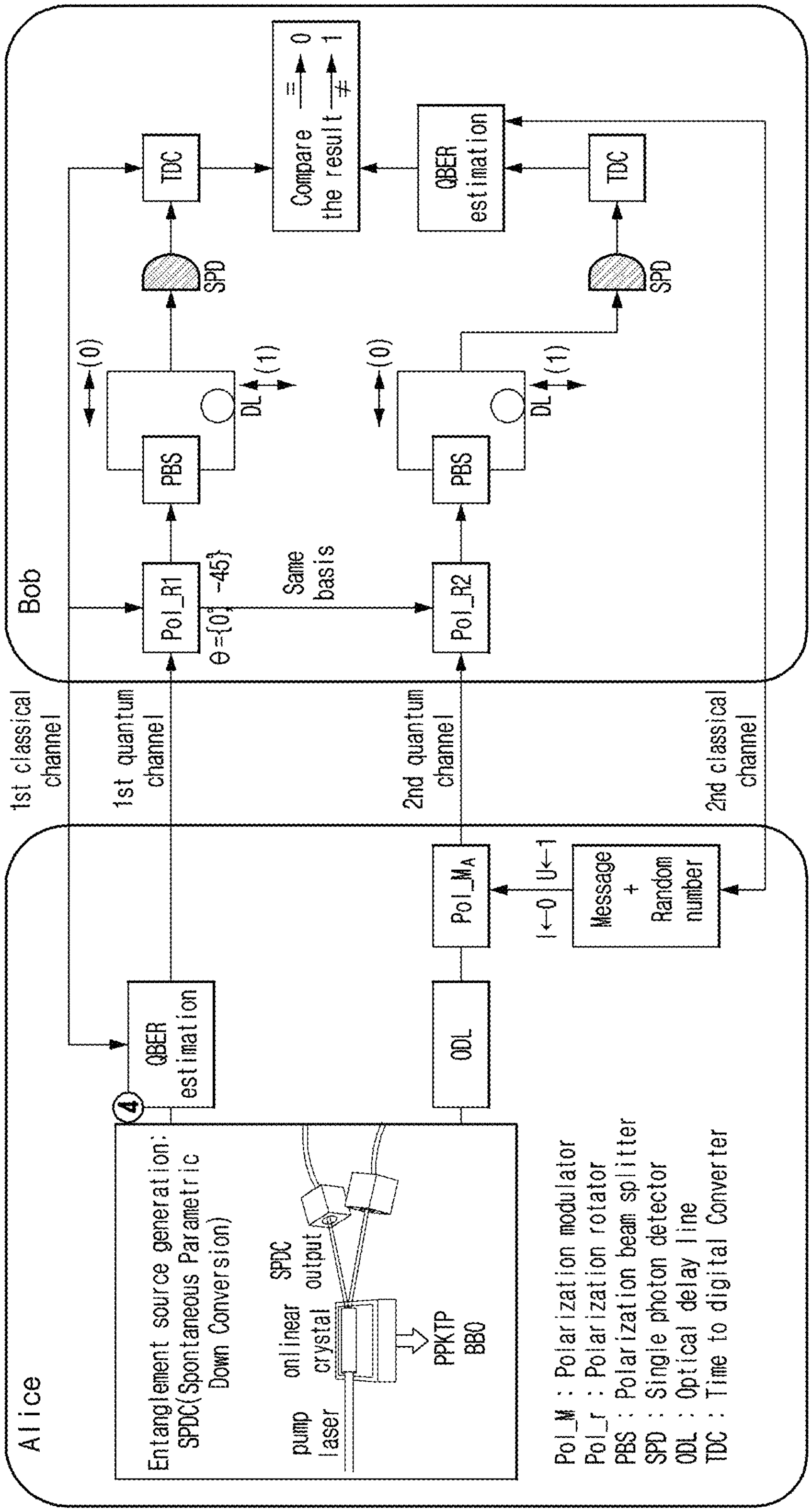

[FIG. 26]
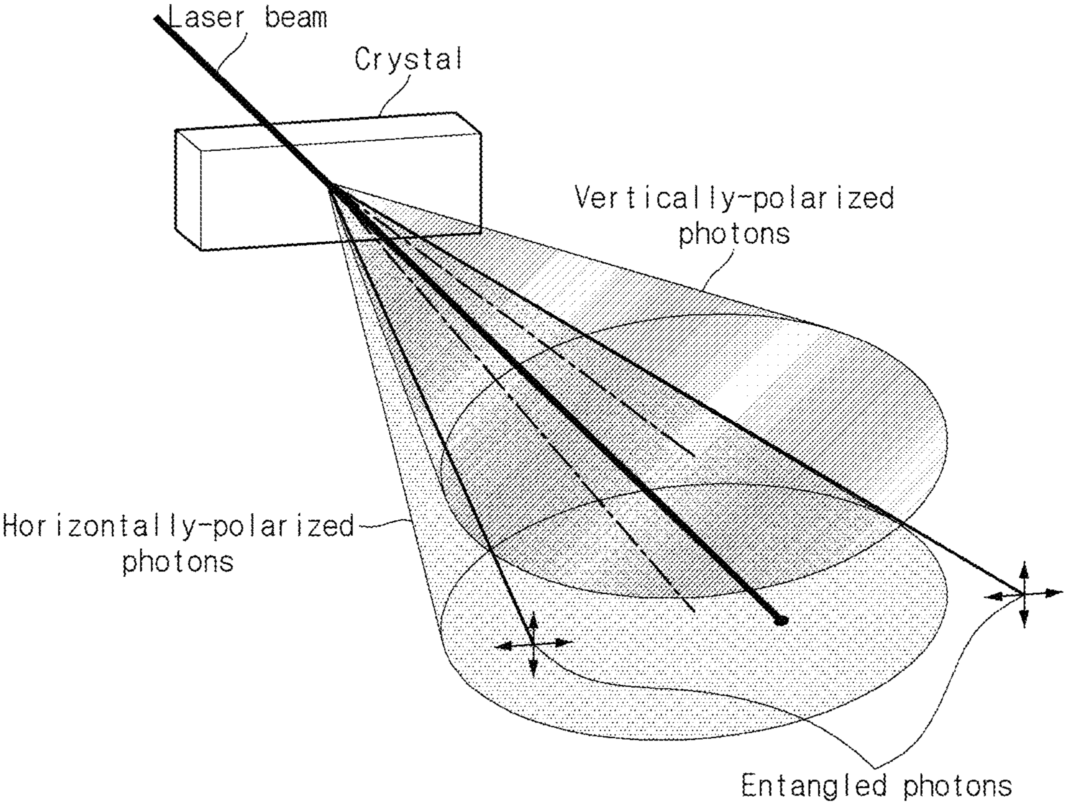

[FIG. 27]
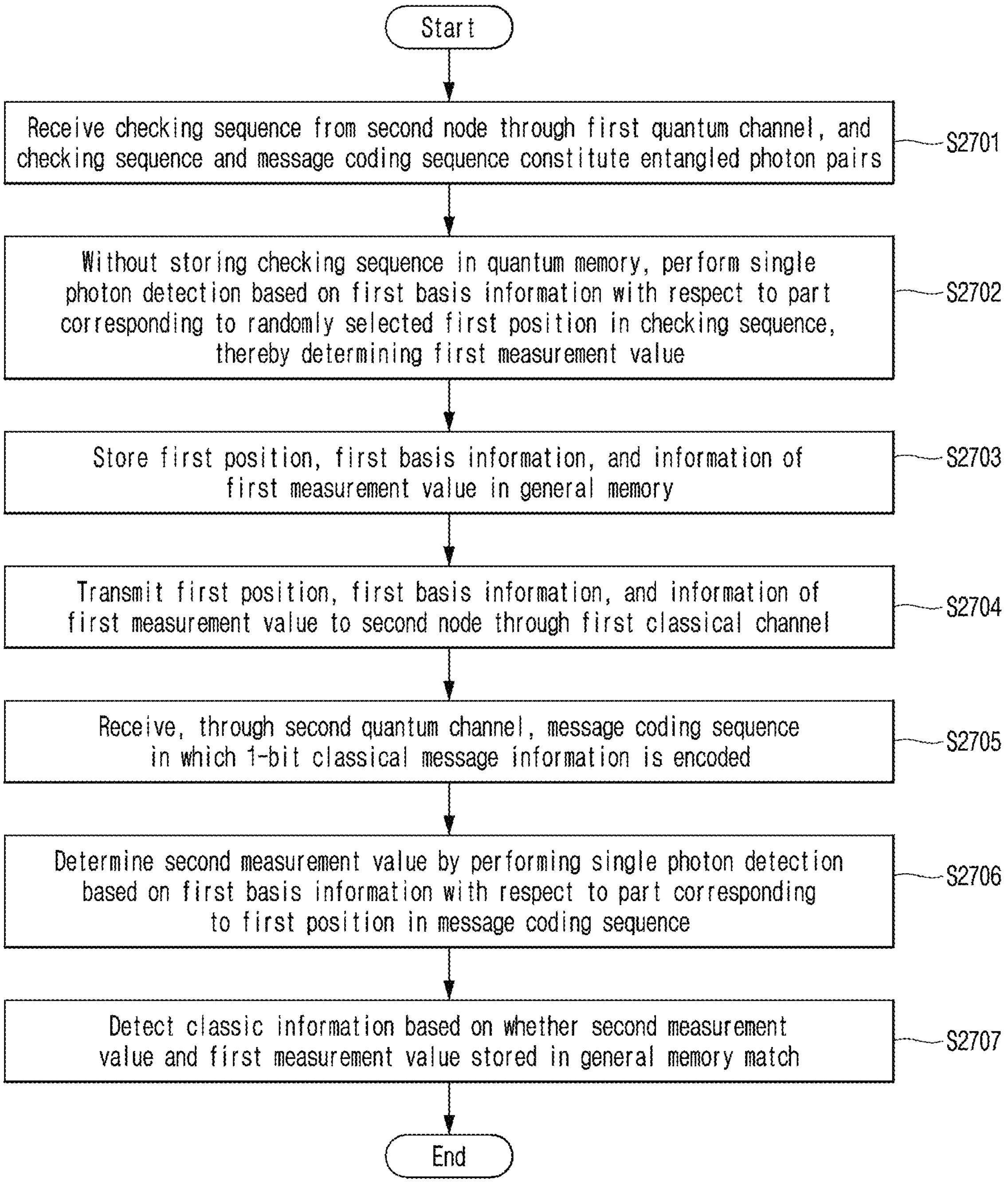

[FIG. 28]
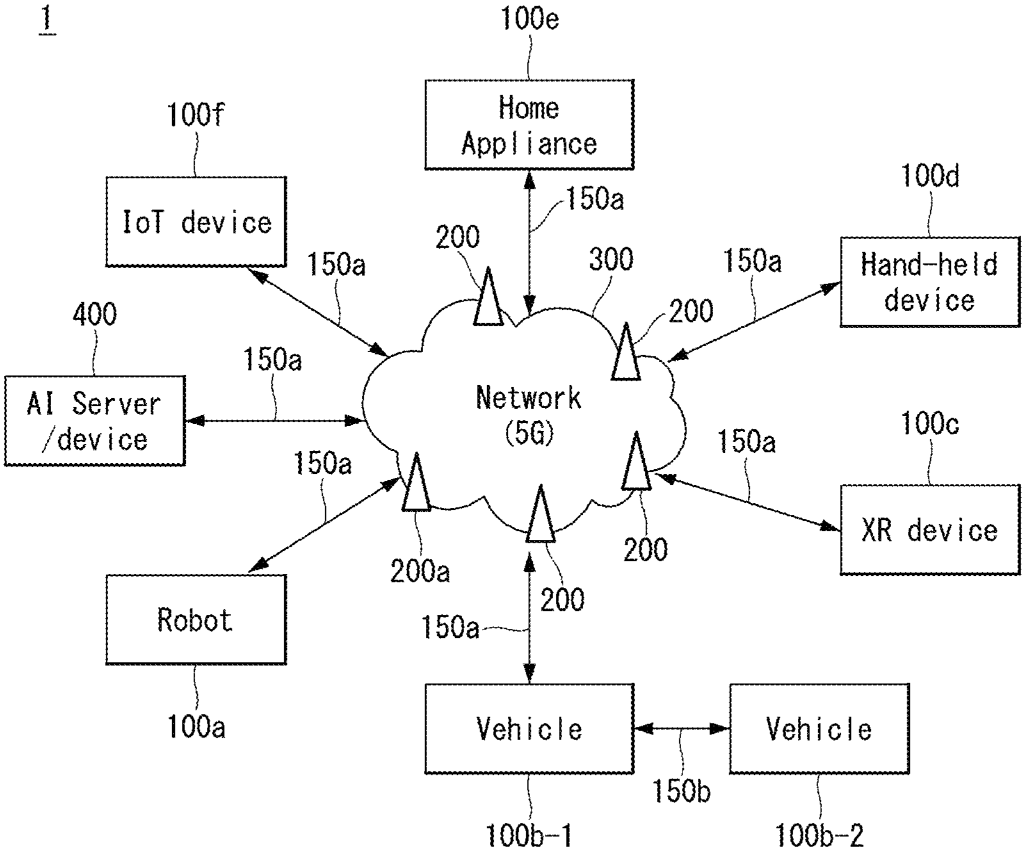

[FIG. 29]
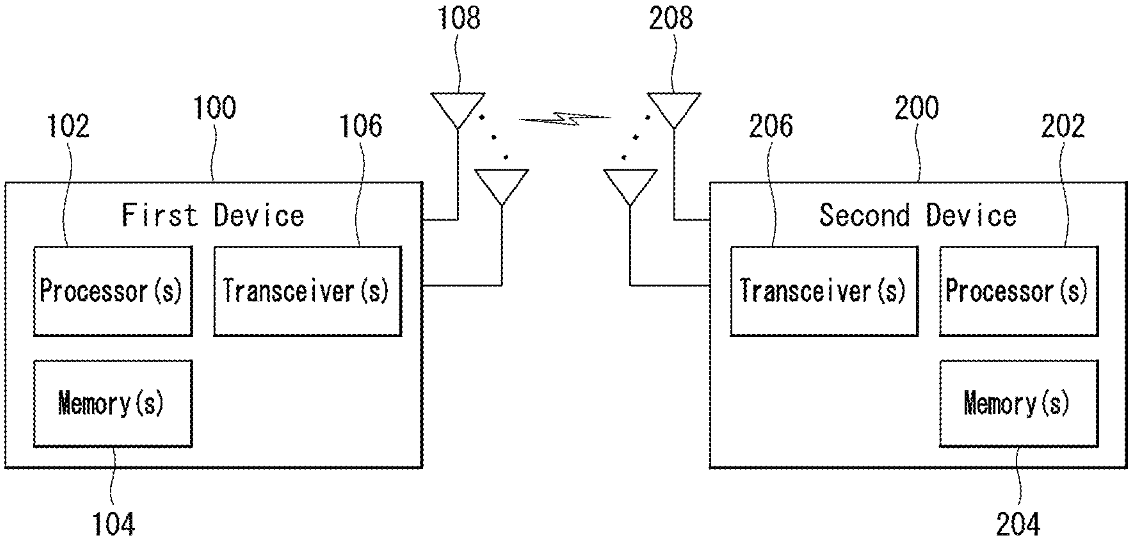

[FIG. 30]
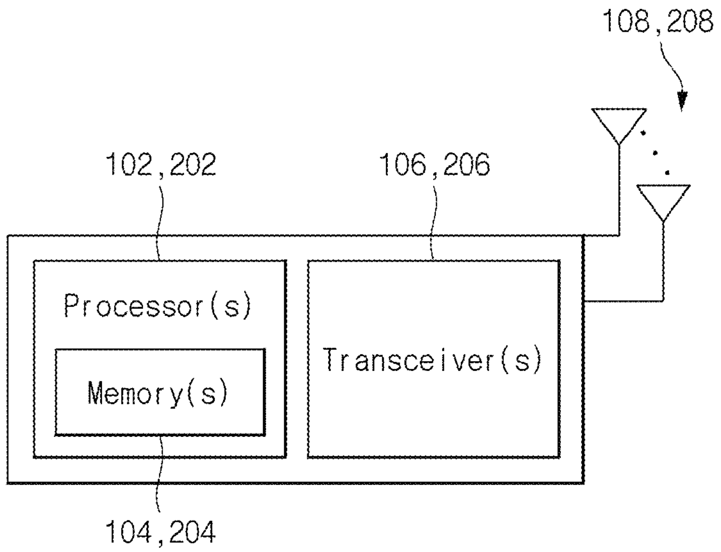

[FIG. 31]
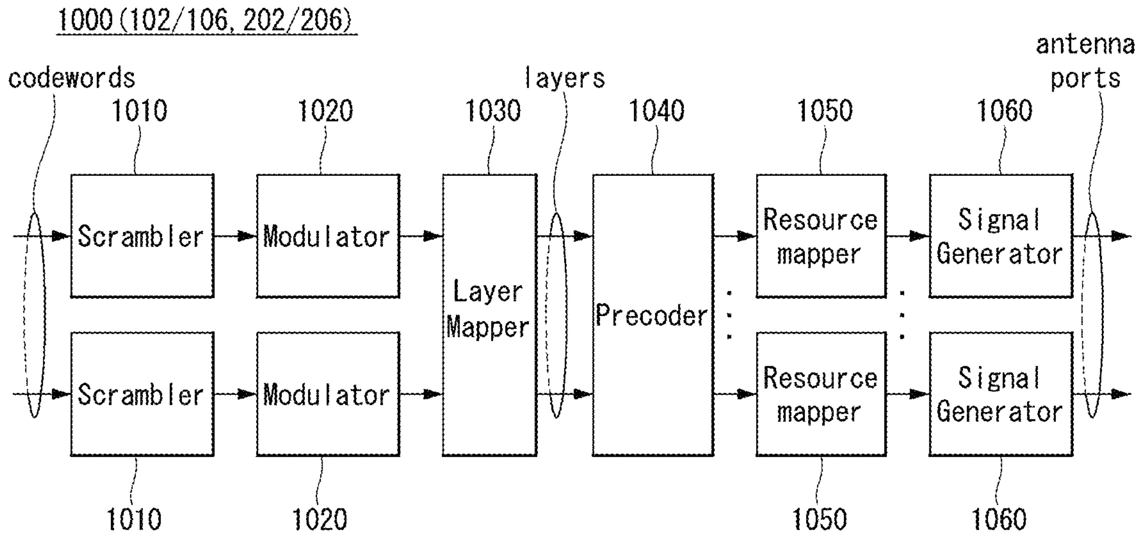

[FIG. 32]
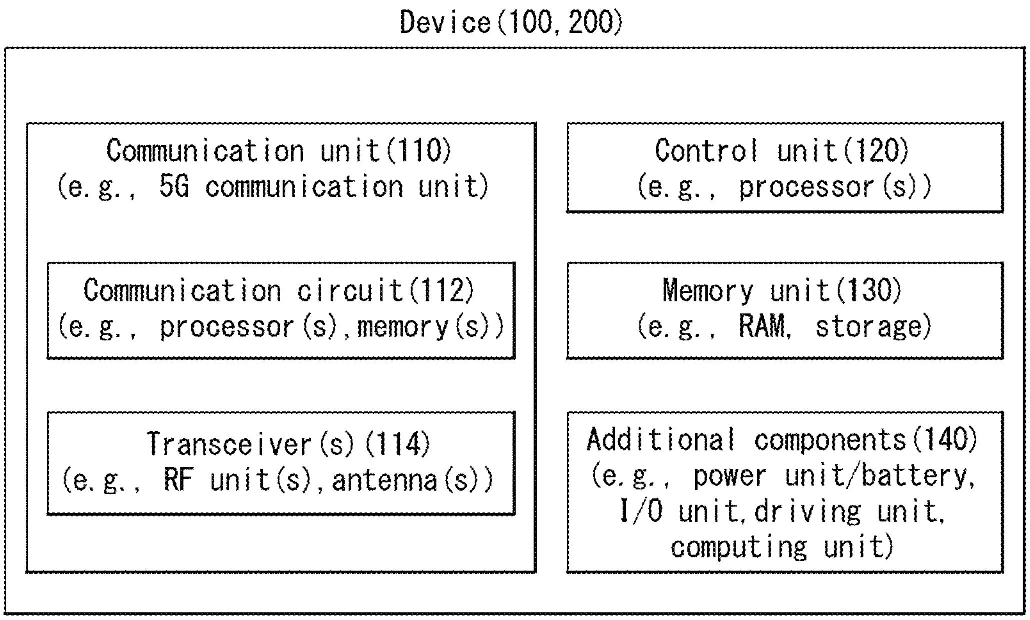

[FIG. 33]
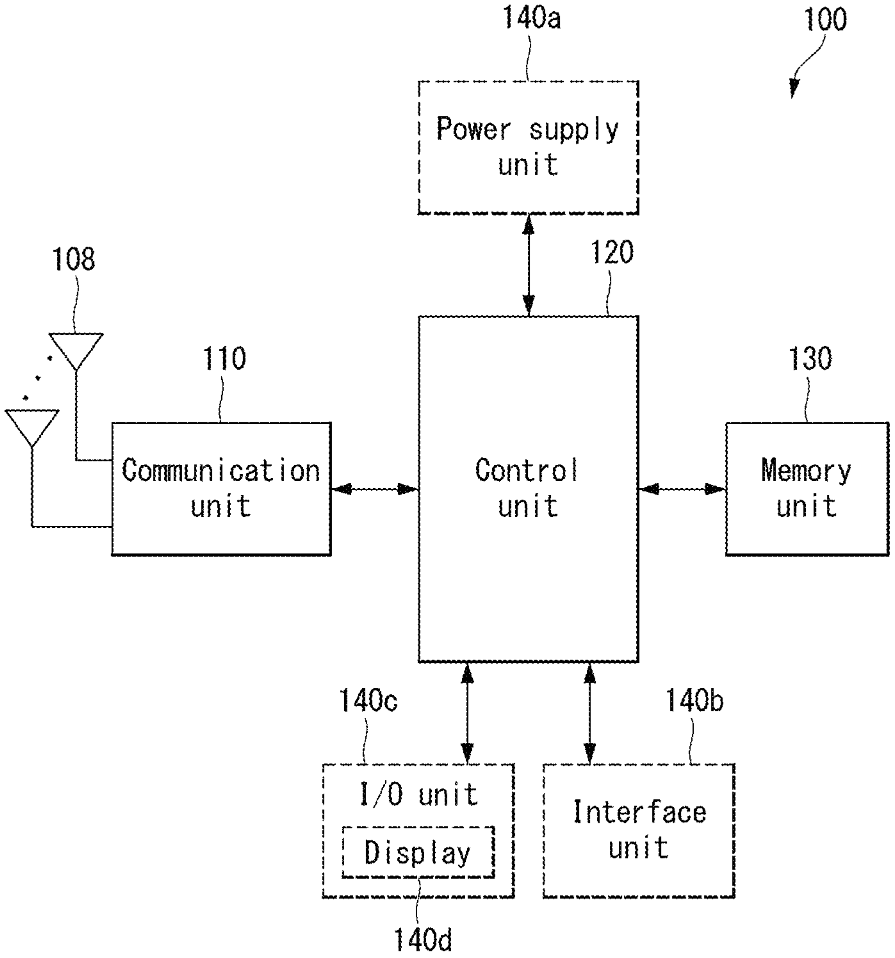

[FIG. 34]
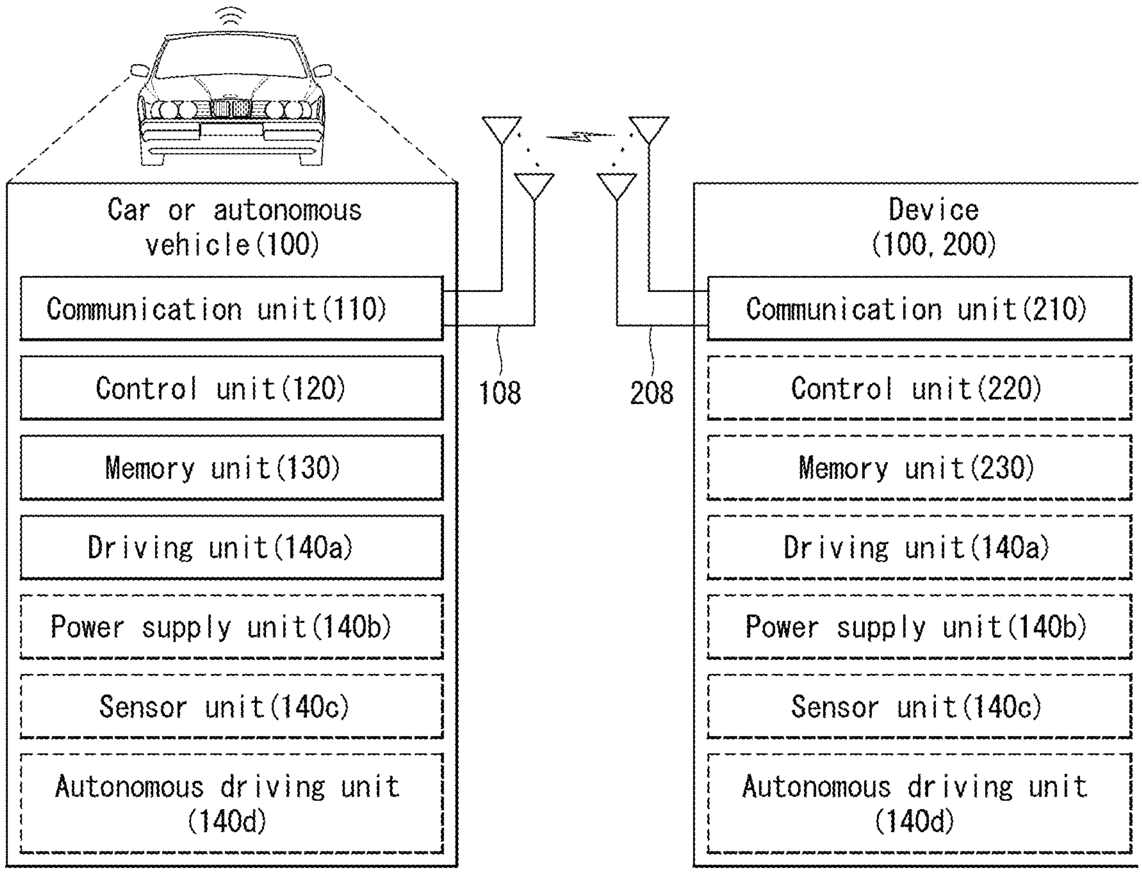

[FIG. 35]
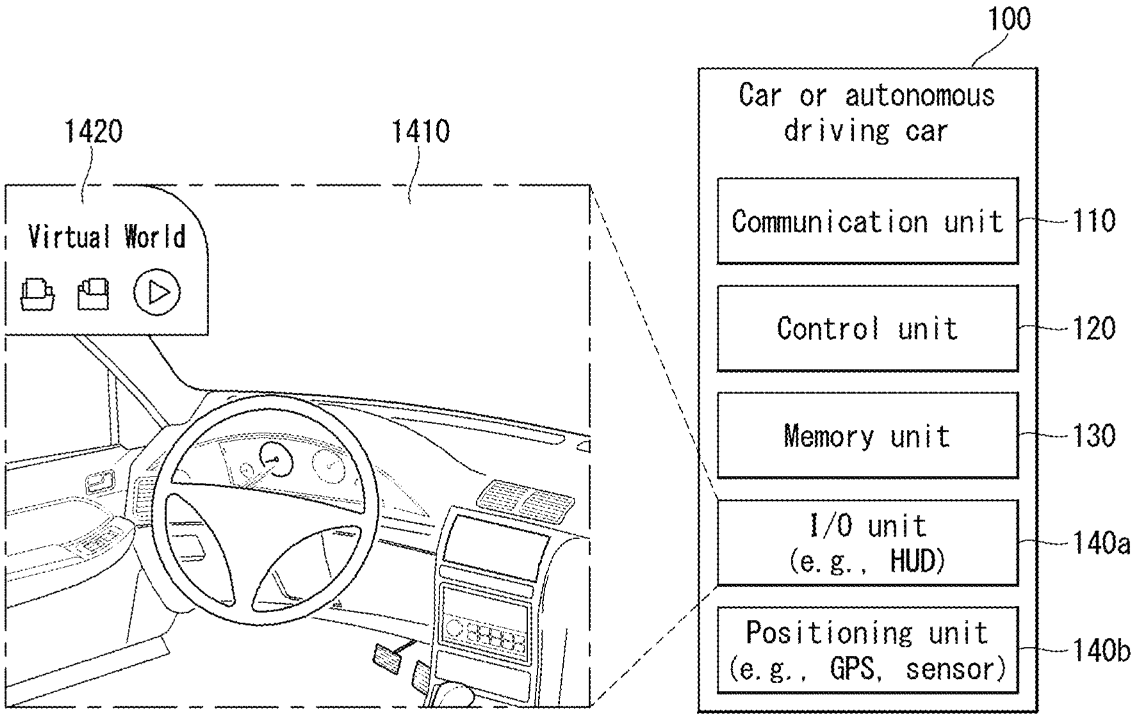

[FIG. 36]
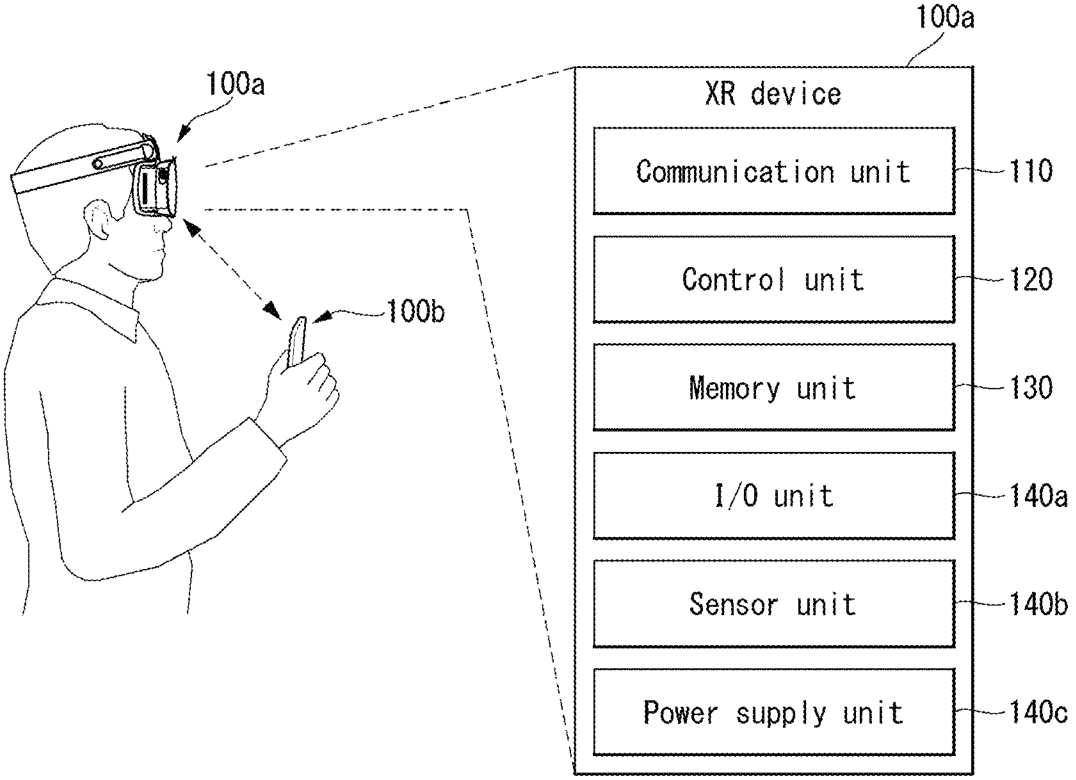

[FIG. 37]
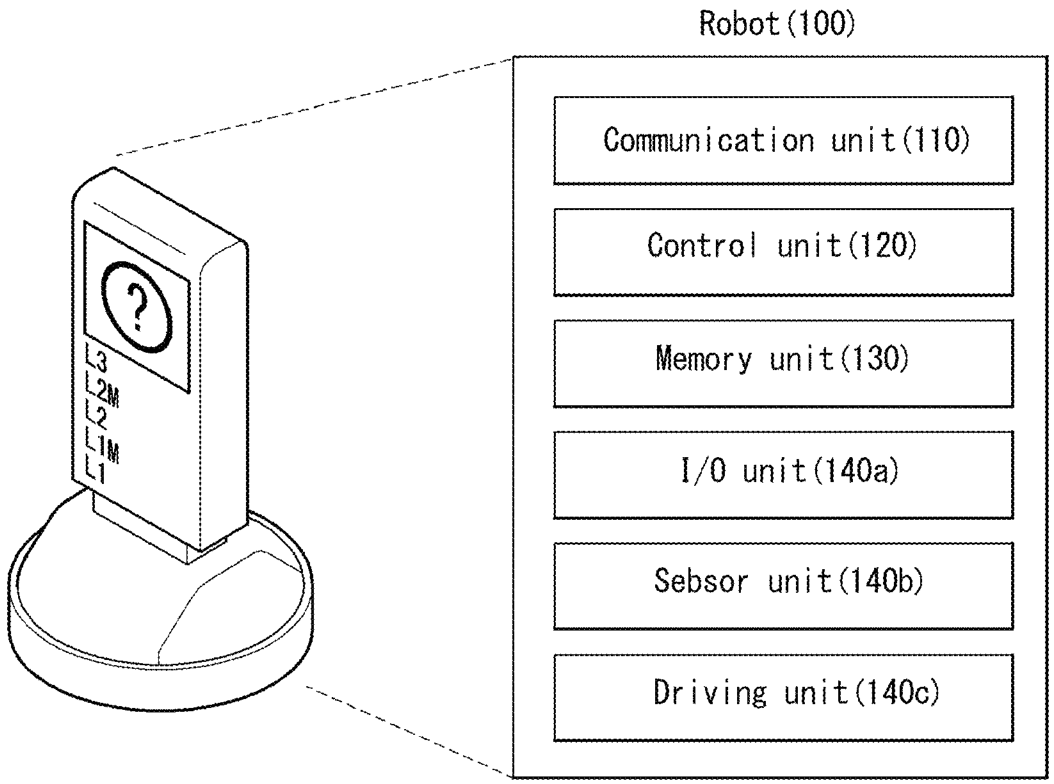

[FIG. 38]
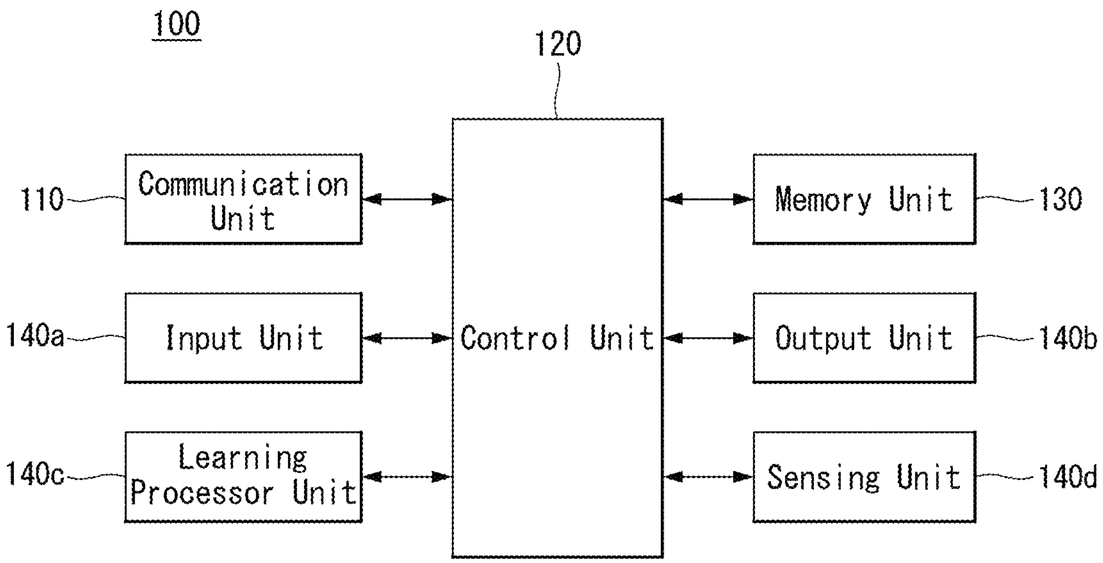

DEVICE AND METHOD FOR PERFORMING QUANTUM SECURE DIRECT COMMUNICATION WITH REDUCED COMPLEXITY IN QUANTUM COMMUNICATION SYSTEM

CROSS-REFERENCE TO RELATED APPLICATION(S)

This application is the National Stage filing under 35 U.S.C. 371 of International Application No. PCT/KR2022/019111, filed on Nov. 29, 2022, which claims the benefit of earlier filing date and right of priority to Korean Application No. 10-2021-0170225, filed on Dec. 1, 2021, the contents of which are all incorporated by reference herein in their entirety.

TECHNICAL FIELD

The present disclosure relates to a quantum communication system. Particularly, the present disclosure relates to a device and a method for performing two-step quantum secure direct communication (QSDC) with a reduced complexity without measuring a quantum memory and a bell state of a receiver in a quantum communication system.

BACKGROUND ART

With the advent of quantum computers, hacking of existing mathematical complexity-based encryption systems (e.g., RSA, AES, etc.) has become possible. In order to prevent hacking, quantum cryptography communication is being proposed.

Meanwhile, the present disclosure relates to a quantum secure direct communication (QSDC) technique that can safely transmit message information directly through a quantum channel among quantum communication techniques, and discloses a method and a device for reducing the complexity of a receiver of an entanglement-based two-step QSDC protocol as a representative technique. Particularly, the present disclosure discloses a method and a device which can reduce a configuration complexity of a receiver, which can detect a received entanglement signal by a low-complexity individual single-photon detection scheme without using a quantum memory and a bell state measurement method used to detect an entanglement state signal including message information by a receiver of an entanglement light source based two step QSDC protocol, and then detect classical message information to be transmitted through checking whether the results match.

DISCLOSURE

Technical Problem

In order to solve the above-described problem, the present disclosure provides a device and a method for performing quantum secure direct communication with a reduced complexity in a quantum communication system.

The present disclosure provides a device and a method for performing two-step quantum secure direct communication (QSDC) with complexity without measuring a quantum memory and a bell state of a receiver in a quantum communication system.

The present disclosure provides a device and a method for reducing a complexity of a receiver of an entanglement based two step QSDC protocol.

The present disclosure provides a device and a method that reduces a complexity of a configuration of the receiver by using a single photon detection scheme without using a quantum memory and a bell state measurement method used to detect an entanglement state signal including message information in a receiver of an entanglement light source based two step QSDC protocol.

The present disclosure provides a device and a method which may reduce a configuration complexity of a receiver, which may detect a received entanglement signal by a low-complexity individual single photon detection scheme, and then detect classical message information to be transmitted through checking whether the results match.

Technical objects to be achieved by the present disclosure are not limited to the aforementioned technical objects, and other technical objects not described above may be evidently understood by a person having ordinary skill in the art to which the present disclosure pertains from the following description.

Technical Solution

According to various embodiments of the disclosure, provided is an operation method of a first node in a quantum communication system, which includes: receiving a checking sequence from a second node through a first quantum channel, wherein the checking sequence and a message coding sequence constitute entangled photon pairs (Einstein-Podolsky-Rosen pairs (EPR-pairs)); without storing the checking sequence in a quantum memory, performing single photon detection on the basis of first basis information with respect to a part corresponding to a randomly selected first position in the checking sequence, thereby determining a first measurement value; storing the first position, the first basis information, and information of the first measurement value in a general memory; transmitting the first position, the first basis information, and the information of the first measurement value to the second node through a first classical channel; receiving, through a second quantum channel, the message coding sequence in which 1-bit classical message information is encoded; determining a second measurement value by performing single photon detection on the basis of the first basis information with respect to a part corresponding to the first position in the message coding sequence; and detecting the classic information on the basis of whether the second measurement value and the first measurement value stored in the general memory match.

According to various embodiments of the disclosure, provided is a first node in a quantum communication system, which includes: a general memory; a transceiver; and at least one processor, in which at least one processor is configured to receive a checking sequence from a second node through a first quantum channel, wherein the checking sequence and a message coding sequence constitute entangled photon pairs (Einstein-Podolsky-Rosen pairs (EPR-pairs)), perform, without storing the checking sequence in a quantum memory, single photon detection on the basis of first basis information with respect to a part corresponding to a randomly selected first position in the checking sequence, thereby determining a first measurement value, store the first position, the first basis information, and information of the first measurement value in a general memory, transmit the first position, the first basis information, and the information of the first measurement value to the second node through a first classical channel, receive, through a second quantum channel, the message coding sequence in which 1-bit classical message information is encoded, perform single photon detection on the basis of the first basis information with respect to a part corresponding to the first position in the message coding sequence, and detect the classic information on the basis of whether the second measurement value and the first measurement value stored in the general memory match.

According to various embodiments of the disclosure, provided are one or more non-transitory computer-readable media storing one or more instructions, in which the one or more instructions perform operations based on being executed by one or more processors, and the operations include: includes: receiving a checking sequence from a second node through a first quantum channel, wherein the checking sequence and a message coding sequence constitute entangled photon pairs (Einstein-Podolsky-Rosen pairs (EPR-pairs)); without storing the checking sequence in a quantum memory, performing single photon detection on the basis of first basis information with respect to a part corresponding to a randomly selected first position in the checking sequence, thereby determining a first measurement value; storing the first position, the first basis information, and information of the first measurement value in a general memory; transmitting the first position, the first basis information, and the information of the first measurement value to the second node through a first classical channel; receiving, through a second quantum channel, the message coding sequence in which 1-bit classical message information is encoded; determining a second measurement value by performing single photon detection on the basis of the first basis information with respect to a part corresponding to the first position in the message coding sequence; and detecting the classic information on the basis of whether the second measurement value and the first measurement value stored in the general memory match.

Advantageous Effects

The present disclosure can provide a device and a method for performing quantum secure direct communication with a reduced complexity in a quantum communication system.

The present disclosure can provide a device and a method for performing two-step quantum secure direct communication (QSDC) with complexity without measuring a quantum memory and a bell state of a receiver in a quantum communication system.

The present disclosure can provide a device and a method for reducing a complexity of a receiver of an entanglement based two step QSDC protocol.

The present disclosure can provide a device and a method that reduces a complexity of a configuration of the receiver by using a single photon detection scheme without using a quantum memory and a bell state measurement method used to detect an entanglement state signal including message information in a receiver of an entanglement light source based two step QSDC protocol.

The present disclosure can provide a device and a method which may reduce a configuration complexity of a receiver, which may detect a received entanglement signal by a low-complexity individual single photon detection scheme, and then detect classical message information to be transmitted through checking whether the results match.

DESCRIPTION OF DRAWINGS

The accompanying drawings, which are to provide a further understanding of the present disclosure, can provide embodiments of the present disclosure together with the detailed description. However, technical features of the present disclosure are not limited to specific drawings and features disclosed in the respective drawings may be combined with each other to constitute a new exemplary embodiment. Reference numerals in each drawing may refer to structural elements.

FIG. 1 illustrates system architecture of new generation radio access network (NG-RAN).

FIG. 2 illustrates functional split between NG-RAN and 5GC.

FIG. 3 illustrates an example of 5G usage scenario.

FIG. 4 illustrates an example of a communication structure providable in a 6G system.

FIG. 5 illustrates an example of a structure of a perceptron.

FIG. 6 illustrates an example of a structure of a multilayer perceptron.

FIG. 7 illustrates an example of a deep neural network.

FIG. 8 illustrates an example of a structure of a convolutional neural network.

FIG. 9 illustrates an example of a filter operation of a convolutional neural network.

FIG. 10 illustrates an example of a neural network structure in which a circular loop exists.

FIG. 11 illustrates an example of an operation structure of a recurrent neural network.

FIG. 12 illustrates an example of an electromagnetic spectrum.

FIG. 13 illustrates an example of a THz communication application.

FIG. 14 illustrates an example of an electronic device-based THz wireless communication transceiver.

FIG. 15 illustrates an example of a method of generating an optical device-based THz signal.

FIG. 16 illustrates an example of an optical device-based THz wireless communication transceiver.

FIG. 17 illustrates a structure of a photoinc source-based transmitter.

FIG. 18 illustrates a structure of an optical modulator.

FIG. 19 schematically shows an example of quantum cryptography communication.

FIG. 20 is a diagram illustrating an example of a two step QSDC configuration in a system applicable to the present disclosure.

FIG. 21 is a diagram illustrating an example of an EPR pair change process in a two-step QSDC protocol in a system applicable to the present disclosure.

FIG. 22 is a diagram illustrating an example of partial Bell state measurement (partial BSM) in a system applicable to the present disclosure.

FIG. 23 is a diagram illustrating an example of complete Bell state measurement (complete BSM) in the system applicable to the present disclosure.

FIG. 24 is a diagram illustrating an example of a two step QSDC in which the quantum memory and the BSM of the receiver are omitted in the system applicable to the present disclosure.

FIG. 25 is a diagram illustrating an example of the configuration of a polarization-based two-step QSDC protocol in the system applicable to the present disclosure.

FIG. 26 is a diagram illustrating an example of a process for generating entangled photons using a spontaneous parametric down conversion (SPDC) scheme in the system applicable to the present disclosure.

FIG. 27 is a diagram illustrating an example of an operation process of a first node in the system applicable to the present disclosure.

FIG. 28 illustrates a communication system 1 applied to various embodiments of the present disclosure.

FIG. 29 illustrates a wireless device applicable to various embodiments of the present disclosure.

FIG. 30 illustrates another example of a wireless device applicable to various embodiments of the present disclosure.

FIG. 31 illustrates a signal processing circuit for a transmission signal.

FIG. 32 illustrates another example of a wireless device applied to various embodiments of the present disclosure.

FIG. 33 illustrates a hand-held device applied to various embodiments of the present disclosure.

FIG. 34 illustrates a vehicle or an autonomous vehicle applied to various embodiments of the present disclosure.

FIG. 35 illustrates a vehicle applied to various embodiments of the present disclosure.

FIG. 36 illustrates an XR device applied to various embodiments of the present disclosure.

FIG. 37 illustrates a robot applied to various embodiments of the present disclosure.

FIG. 38 illustrates an AI device applied to various embodiments of the present disclosure.

MODE FOR DISCLOSURE

In various embodiments of the present disclosure, "A or B" may mean "only A," "only B" or "both A and B." In other words, in various embodiments of the present disclosure, "A or B" may be interpreted as "A and/or B." For example, in various embodiments of the present disclosure, "A, B or C" may mean "only A," "only B," "only C" or "any combination of A, B and C."

A slash (/) or comma used in various embodiments of the present disclosure may mean "and/or." For example, "A/B" may mean "A and/or B." Hence, "A/B" may mean "only A," "only B" or "both A and B." For example, "A, B, C" may mean "A, B, or C."

In various embodiments of the present disclosure, "at least one of A and B" may mean "only A," "only B" or "both A and B." In addition, in various embodiments of the present disclosure, the expression of "at least one of A or B" or "at least one of A and/or B" may be interpreted in the same meaning as "at least one of A and B."

Further, in various embodiments of the present disclosure, "at least one of A, B, and C" may mean "only A," "only B," "only C" or "any combination of A, B and C." In addition, "at least one of A, B or C" or "at least one of A, B and/or C" may mean "at least one of A, B, and C."

Further, parentheses used in various embodiments of the present disclosure may mean "for example." Specifically, when "control information (PDCCH)" is described, "PDCCH" may be proposed as an example of "control information." In other words, "control information" in various embodiments of the present disclosure is not limited to "PDCCH," and "PDDCH" may be proposed as an example of "control information." In addition, even when "control information (i.e., PDCCH)" is described, "PDCCH" may be proposed as an example of "control information."

Technical features described individually in one drawing in various embodiments of the present disclosure may be implemented individually or simultaneously.

New radio access technology (RAT, NR) is described below.

As more and more communication devices require larger communication capacity, there is a need for enhanced mobile broadband communication compared to the existing radio access technology (RAT). Massive machine type communications (MTCs) which provide various services anytime and anywhere by connecting many devices and objects are also one of the major issues to be considered in next-generation communications. In addition, a communication system design considering a service/UE sensitive to reliability and latency is also being discussed. As above, the introduction of next generation radio access technology considering enhanced mobile broadband communication, massive MTC, ultra-reliable and low latency communication (URLLC), etc. is discussed, and the technology is called new RAT or NR for convenience in various embodiments of the present disclosure.

FIG. 1 illustrates system architecture of new generation radio access network (NG-RAN).

Referring to FIG. 1, the NG-RAN may include gNB and/or eNB providing user plane and control plane protocol terminations toward the UE. FIG. 2 illustrates an example where the NG-RAN includes only the gNB. The gNB and the eNB are interconnected via Xn interface. The gNB and the eNB are connected to the 5G core network (5GC) via NG interface. More specifically, the gNB and the eNB are connected to an access and mobility management function (AMF) via NG-C interface and connected to a user plane function (UPF) via NG-U interface.

FIG. 2 illustrates functional split between NG-RAN and 5GC.

Referring to FIG. 2, the gNB may provide functions including Inter Cell RRM, RB control, connection mobility control, radio admission control, measurement configuration and provision, dynamic resource allocation, etc. The AMF may provide functions including non-access stratum (NAS) security, idle state mobility processing, etc. The UPF may provide functions including mobility anchoring, protocol data unit (PDU) processing, etc. The session management function (SMF) may provide functions including UE IP address allocation, PDU session control, etc.

FIG. 3 illustrates an example of 5G usage scenario.

The 5G usage scenario illustrated in FIG. 3 is merely an example, and technical features according to various embodiments of the present disclosure can be applied to other 5G usage scenarios that are not illustrated in FIG. 3.

Referring to FIG. 3, three major requirement areas of 5G include (1) an enhanced mobile broadband (eMBB) area, (2) a massive machine type communication (mMTC) area and (3) an ultra-reliable and low latency communications (URLLC) area. Some use cases may require multiple areas for optimization, and other use case may focus only on one key performance indicator (KPI). 5G intends to support such diverse use cases in a flexible and reliable way.

eMBB focuses on across-the-board enhancements to the data rate, latency, user density, capacity and coverage of mobile broadband access, eMBB targets throughput of about 10 Gbps, eMBB goes far beyond basic mobile Internet access and covers rich interactive work, media and entertainment applications in the cloud or augmented reality. Data will be one of the key drivers for 5G and in new parts of this system we may for the first time see no dedicated voice service in the 5G era. In 5G, voice is expected to be handled as an application, simply using the data connectivity provided by the communication system. The main drivers for the increased traffic volume include an increase in size of content and an increase in the number of applications requiring high data transfer rates. Streaming service (audio and video), interactive video and mobile Internet connectivity will continue to be used more broadly as more devices connect to the Internet. Many of these applications require always-on connectivity to push real time information and notifications to the users. Cloud storage and applications are rapidly increasing for mobile communication platforms. This is applicable for both work and entertainment. Cloud storage is one particular use case driving the growth of uplink data transfer rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality for entertainment and information retrieval. The augmented reality requires very low latencies and significant instant data volumes.

mMTC is designed to enable communication between devices that are low-cost, massive in number and battery-driven, and is intended to support applications such as smart metering, logistics, and field and body sensors, mMTC targets batteries with a lifespan of about 10 years and/or about 1 million devices per km2, mMTC enables to smoothly connect embedded sensors in all fields and is one of the most expected 5G use case. It is predicted that IoT devices will potentially reach 20.4 billion by 2020. Industrial IoT is one area where 5G will play a major role, enabling smart cities, asset tracking, smart utilities, agriculture, and security infrastructure.

URLLC will make it possible for devices and machines to communicate with ultra-reliability, very low latency and high availability, making it ideal for vehicular communication, industrial control, factory automation, remote surgery, smart grids and public safety applications. URLLC targets latency of about 1 ms. URLLC includes new services that will transform industries with ultra-reliable/low latency links like remote control of critical infrastructure and an autonomous vehicle. The level of reliability and latency is vital to smart grid control, industrial automation, robotics, and drone control and coordination.

Next, multiple use cases included within the triangle of FIG. 3 are described in more detail.

5G may supplement fiber-to-the-home (FTTH) and cable-based broadband (or DOCSIS) as means for providing a stream evaluated from gigabits per second to several hundreds of megabits per second. Such fast speed may be necessary to deliver TV with resolution of 4K or more (6K, 8K or more) in addition to virtual reality (VR) and augmented reality (AR). VR and AR applications include immersive sports games. A specific application may require special network configuration. For example, in the VR game, in order for game companies to minimize latency, a core server may need to be integrated with an edge network server of a network operator.

The automotive sector is expected to be an important new driver for 5G, along with many use cases for mobile communications for vehicles. For example, entertainment for passengers requires high capacity and high mobile broadband at the same time. The reason for this is that future users will expect to continue their good quality connection independent of their location and speed. Other use cases for the automotive sector are augmented reality dashboards. The augmented reality dashboards display overlay information on top of what a driver is seeing through the front window through the augmented reality dashboards, identifying objects in the dark and telling the driver about the distances and movements of the objects. In the future, wireless modules will enable communication between vehicles, information exchange between vehicles and supporting infrastructure, and information exchange between vehicles and other connected devices (e.g., devices carried by pedestrians). Safety systems guide drivers on alternative courses of action to allow them to drive more safely and lower the risks of accidents. A next phase will be a remotely controlled vehicle or an autonomous vehicle. This requires ultra reliable and very fast communication between different autonomous vehicles and/or between vehicles and infrastructure. In the future, an autonomous vehicle may take care of all driving activity, allowing the driver to rest and concentrate only on traffic anomalies that the vehicle itself cannot identify. The technical requirements for autonomous vehicles require for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost and energy-efficient maintenance of the city or home. A similar setup can be done for each home, where temperature sensors, window and heating controllers, burglar alarms and home appliances are all connected wirelessly. Many of these sensors are typically low data rate, low power and low cost. However, for example, real time HD video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information can include the behaviors of suppliers and consumers, allowing the smart grid to improve the efficiency, reliability, economics and sustainability of the production and distribution of fuels such as electricity in an automated fashion. A smart grid can be seen as another sensor network with low delays.

The health sector has many applications that can benefit from mobile communications. Communications systems enable telemedicine, which provides clinical health care at a distance. It helps eliminate distance barriers and can improve access to medical services that would often not be consistently available in distant rural communities. It is also used to save lives in critical care and emergency situations. Wireless sensor networks based on mobile communication can provide remote monitoring and sensors for parameters such as heart rate and blood pressure.

Wireless and mobile communications are becoming increasingly important for industrial application. Wires are expensive to install and maintain. Therefore, the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G. Logistics and freight tracking are important use cases for mobile communications that enable the tracking of inventory and packages wherever they are through using location based information systems. The logistics and freight use cases typically require lower data rates but need wide coverage and reliable location information.

Examples of next generation communication (e.g., 6G) that can be applied to various embodiments of the present disclosure are described below.

6G System General

A 6G (wireless communication) system has purposes such as (i) a very high data rate per device, (ii) a very large number of connected devices, (iii) global connectivity, (iv) a very low latency, (v) a reduction in energy consumption of battery-free IoT devices, (vi) ultra-reliable connectivity, and (vii) connected intelligence with machine learning capability. The vision of the 6G system may include four aspects such as intelligent connectivity, deep connectivity, holographic connectivity, and ubiquitous connectivity, and the 6G system may satisfy the requirements shown in Table 1 below. That is, Table 1 shows an example of the requirements of the 6G system.

TABLE 1

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

The 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion, and enhanced data security.

FIG. 4 illustrates an example of a communication structure providable in a 6G system.

The 6G system is expected to have 50 times greater simultaneous wireless communication connectivity than a 5G wireless communication system. URLLC, which is the key feature of 5G, will become more important technology by providing an end-to-end latency less than 1 ms in 6G communication. The 6G system may have much better volumetric spectrum efficiency unlike frequently used domain spectrum efficiency. The 6G system can provide advanced battery technology for energy harvesting and very long battery life, and thus mobile devices may not need to be separately charged in the 6G system. In 6G, new network characteristics may be as follows.

- Satellites integrated network: To provide a global mobile group, 6G will be integrated with satellite. Integration of terrestrial, satellite and public networks into one wireless communication system is critical for 6G.
- Connected intelligence: Unlike the wireless communication systems of previous generations, 6G is innovative and may update wireless evolution from "connected things" to "connected intelligence". AI may be applied in each step (or each signal processing procedure to be described later) of a communication procedure.
- Seamless integration of wireless information and energy transfer: A 6G wireless network may transfer power to charge batteries of devices such as smartphones and sensors. Therefore, wireless information and energy transfer (WIET) will be integrated.
- Ubiquitous super 3D connectivity: Access to networks and core network functions of drone and very low earth orbit satellite will establish super 3D connectivity in 6G ubiquitous.

In the new network characteristics of 6G described above, several general requirements may be as follows.

- Small cell networks: The idea of a small cell network has been introduced to improve received signal quality as a result of throughput, energy efficiency, and spectrum efficiency improvement in a cellular system. As a result, the small cell network is an essential feature for 5G and beyond 5G (5 GB) communication systems. Accordingly, the 6G communication system also employs the characteristics of the small cell network.
- Ultra-dense heterogeneous network: Ultra-dense heterogeneous networks will be another important characteristic of the 6G communication system. A multi-tier network consisting of heterogeneous networks improves overall QoS and reduces costs.
- High-capacity backhaul: Backhaul connectivity is characterized by a high-capacity backhaul network in order to support high-capacity traffic. A high-speed optical fiber and free space optical (FSO) system may be a possible solution for this problem.
- Radar technology integrated with mobile technology: High-precision localization (or location-based service) through communication is one of the functions of the 6G wireless communication system. Accordingly, the radar system will be integrated with the 6G network.
- Softwarization and virtualization: Softwarization and virtualization are two important functions which are the bases of a design process in a 5 GB network in order to ensure flexibility, reconfigurability and programmability. Further, billions of devices can be shared on a shared physical infrastructure.

Core Implementation Technology of 6G System

Artificial Intelligence (AI)

Technology which is most important in the 6G system and will be newly introduced is AI. AI was not involved in the 4G system. The 5G system will support partial or very limited AI. However, the 6G system will support AI for full automation. Advance in machine learning will create a more intelligent network for real-time communication in 6G. When AI is introduced to communication, real-time data transmission can be simplified and improved. AI may determine a method of performing complicated target tasks using countless analysis. That is, AI can increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, and in particular, deep learning has been focused on the wireless resource management and allocation field. However, such studies have been gradually developed to the MAC layer and the physical layer, and in particular, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. The machine learning may also be used for antenna selection, power control, symbol detection, etc. in the MIMO system.

However, application of a deep neutral network (DNN) for transmission in the physical layer may have the following problems.

A deep learning based AI algorithm requires a lot of training data in order to optimize training parameters. However, due to limitations in acquiring data in a specific channel environment as the training data, a lot of training data is used offline. Static training for the training data in the specific channel environment may cause a contradiction between the diversity and dynamic characteristics of a radio channel.

Currently, the deep learning mainly targets real signals. However, signals of the physical layer of wireless communication are complex signals. For matching of the characteristics of a wireless communication signal, studies on a neural network for detecting a complex domain signal are further required.

Hereinafter, machine learning is described in more detail.

Machine learning refers to a series of operations to train a machine in order to create a machine capable of doing tasks that people cannot do or are difficult for people to do. Machine learning requires data and learning models. In the machine learning, a data learning method may be roughly divided into three methods, that is, supervised learning, unsupervised learning and reinforcement learning.

Neural network learning is to minimize an output error. The neural network learning refers to a process of repeatedly inputting training data to a neural network, calculating an error of an output and a target of the neural network for the training data, backpropagating the error of the neural network from an output layer to an input layer of the neural network for the purpose of reducing the error, and updating a weight of each node of the neural network.

The supervised learning may use training data labeled with a correct answer, and the unsupervised learning may use training data which is not labeled with a correct answer. That is, for example, in supervised learning for data classification, training data may be data in which each training data is labeled with a category. The labeled training data may be input to the neural network, and the error may be calculated by comparing the output (category) of the neural network with the label of the training data. The calculated error is backpropagated in the neural network in the reverse direction (i.e., from the output layer to the input layer), and a connection weight of respective nodes of each layer of the neural network may be updated based on the backpropagation. Change in the updated connection weight of each node may be determined depending on a learning rate. The calculation of the neural network for input data and the backpropagation of the error may construct a learning cycle (epoch). The learning rate may be differently applied based on the number of repetitions of the learning cycle of the neural network. For example, in the early stage of learning of the neural network, efficiency can be increased by allowing the neural network to rapidly ensure a certain level of performance using a high learning rate, and in the late of learning, accuracy can be increased using a low learning rate.

The learning method may vary depending on the feature of data. For example, in order for a reception end to accurately predict data transmitted from a transmission end on a communication system, it is preferable that learning is performed using the supervised learning rather than the unsupervised learning or the reinforcement learning.

The learning model corresponds to the human brain and may be regarded as the most basic linear model. However, a paradigm of machine learning using, as the learning model, a neural network structure with high complexity, such as artificial neural networks, is referred to as deep learning.

Neural network cores used as the learning method may roughly include a deep neural network (DNN) method, a convolutional deep neural network (CNN) method, and a recurrent Boltzmann machine (RNN) method.

The artificial neural network is an example of connecting several perceptrons.

FIG. 5 illustrates an example of a structure of a perceptron.

Referring to FIG. 5, when an input vector x=(x1, x2, . . . , xd) is input, each component is multiplied by a weight (W1, W2, . . . , Wd), and all the results are summed. After that, the entire process of applying an activation function $\sigma(\cdot)$ is called a perceptron. The huge artificial neural network structure may extend the simplified perceptron structure illustrated in FIG. 5 to apply the input vector to different multidimensional perceptrons. For convenience of explanation, an input value or an output value is referred to as a node.

The perceptron structure illustrated in FIG. 5 may be described as consisting of a total of three layers based on the input value and the output value. FIG. 6 illustrates an artificial neural network in which the number of (d+1) dimensional perceptrons between a first layer and a second layer is H, and the number of (H+1) dimensional perceptrons between the second layer and a third layer is K, by way of example.

FIG. 6 illustrates an example of a structure of a multilayer perceptron.

A layer where the input vector is located is called an input layer, a layer where a final output value is located is called an output layer, and all layers located between the input layer and the output layer are called a hidden layer. FIG. 6 illustrates three layers, by way of example. However, since the number of layers of the artificial neural network is counted excluding the input layer, it can be seen as a total of two layers. The artificial neural network is constructed by connecting the perceptrons of a basic block in two dimensions.

The above-described input layer, hidden layer, and output layer can be jointly applied in various artificial neural network structures, such as CNN and RNN to be described later, as well as the multilayer perceptron. The greater the number of hidden layers, the deeper the artificial neural network is, and a machine learning paradigm that uses the sufficiently deep artificial neural network as a learning model is called deep learning. In addition, the artificial neural network used for deep learning is called a deep neural network (DNN).

FIG. 7 illustrates an example of a deep neural network.

The deep neural network illustrated in FIG. 7 is a multilayer perceptron consisting of eight hidden layers+eight output layers. The multilayer perceptron structure is expressed as a fully connected neural network. In the fully connected neural network, a connection relationship does not exist between nodes located at the same layer, and a connection relationship exists only between nodes located at adjacent layers. The DNN has a fully connected neural network structure and is composed of a combination of multiple hidden layers and activation functions, so it can be usefully applied to understand correlation characteristics between input and output. The correlation characteristic may mean a joint probability of input and output.

Based on how the plurality of perceptrons are connected to each other, various artificial neural network structures different from the above-described DNN can be formed.

FIG. 8 illustrates an example of a structure of a convolutional neural network.

In the DNN, nodes located inside one layer are arranged in a one-dimensional longitudinal direction. However, in FIG. 8, it may be assumed that w nodes horizontally and h nodes vertically are arranged in two dimensions (convolutional neural network structure of FIG. 8). In this case, since in a connection process leading from one input node to the hidden layer, a weight is given for each connection, a total of h×w weights needs to be considered. Since there are h×w nodes in the input layer, a total of h2w2 weights are required between two adjacent layers.

The convolutional neural network of FIG. 8 has a problem in that the number of weights increases exponentially depending on the number of connections. Therefore, instead of considering the connections of all the nodes between adjacent layers, it is assumed that a small-sized filter exists, and a weighted sum and an activation function calculation are performed on an overlap portion of the filters as illustrated in FIG. 9.

FIG. 9 illustrates an example of a filter operation of a convolutional neural network.

One filter has a weight corresponding to the number as much as its size, and learning of the weight may be performed so that a certain feature on an image can be extracted and output as a factor. In FIG. 9, a filter having a size of 3×3 is applied to the upper leftmost 3×3 area of the input layer, and an output value obtained by performing a weighted sum and an activation function calculation for a corresponding node is stored in z22.

The filter performs the weighted sum and the activation function calculation while moving horizontally and vertically by a predetermined interval when scanning the input layer, and places the output value at a location of a current filter. This calculation method is similar to the convolution operation on images in the field of computer vision. Thus, a deep neural network with this structure is referred to as a convolutional neural network (CNN), and a hidden layer generated as a result of the convolution operation is referred to as a convolutional layer. In addition, a neural network in which a plurality of convolutional layers exists is referred to as a deep convolutional neural network (DCNN).

At the node where a current filter is located at the convolutional layer, the number of weights may be reduced by calculating a weighted sum including only nodes located in an area covered by the filter. Hence, one filter can be used to focus on features for a local area. Accordingly, the CNN can be effectively applied to image data processing in which a physical distance on the 2D area is an important criterion. In the CNN, a plurality of filters may be applied immediately before the convolution layer, and a plurality of output results may be generated through a convolution operation of each filter.

There may be data whose sequence characteristics are important depending on data attributes. A structure, in which a method of inputting one element on the data sequence at each time step considering a length variability and a relationship of the sequence data and inputting an output vector (hidden vector) of a hidden layer output at a specific time step together with a next element on the data sequence is applied to the artificial neural network, is referred to as a recurrent neural network structure.

FIG. 10 illustrates an example of a neural network structure in which a circular loop exists.

Referring to FIG. 10, a recurrent neural network (RNN) is a structure in which in a process of inputting elements (x1(t), x2(t), . . . , xd(t)) of any line of sight ‘t’ on a data sequence to a fully connected neural network, hidden vectors (z1(t−1), z2(t−1), . . . , zH(t−1)) are input together at an immediately previous time step(t−1) to apply a weighted sum and an activation function. A reason for transferring the hidden vectors at a next time step is that information within the input vector in previous time steps is considered to be accumulated on the hidden vectors of a current time step.

FIG. 11 illustrates an example of an operation structure of a recurrent neural network.

Referring to FIG. 11, the recurrent neural network operates in a predetermined order of time with respect to an input data sequence.

Hidden vectors (z1(1), z2(1), . . . , zH(1)) when input vectors (x1(t), x2(t), . . . , xd(t)) at a time step 1 are input to the recurrent neural network, are input together with input vectors (x1(2), x2(2), . . . , xd(2)) at a time step 2 to determine vectors (z1(2), z2(2), . . . , zH(2)) of a hidden layer through a weighted sum and an activation function. This process is repeatedly performed at time steps 2, 3, . . . , T.

When a plurality of hidden layers are disposed in the recurrent neural network, this is referred to as a deep recurrent neural network (DRNN). The recurrent neural network is designed to be usefully applied to sequence data (e.g., natural language processing).

A neural network core used as a learning method includes various deep learning methods such as a restricted Boltzmann machine (RBM), a deep belief network (DBN), and a deep Q-network, in addition to the DNN, the CNN, and the RNN, and may be applied to fields such as computer vision, speech recognition, natural language processing, and voice/signal processing.

Recently, attempts to integrate AI with a wireless communication system have appeared, but this has been concentrated in the field of wireless resource management and allocation in the application layer, network layer, in particular, deep learning. However, such research is gradually developing into the MAC layer and the physical layer, and in particular, attempts to combine deep learning with wireless transmission in the physical layer have appeared. The AI-based physical layer transmission refers to applying a signal processing and communication mechanism based on an AI driver, rather than a traditional communication framework in the fundamental signal processing and communication mechanism. For example, deep learning-based channel coding and decoding, deep learning-based signal estimation and detection, deep learning-based MIMO mechanism, AI-based resource scheduling and allocation, and the like, may be included.

Terahertz (THz) Communication

A data transfer rate can be increased by increasing the bandwidth. This can be performed by using sub-TH communication as a wide bandwidth and applying advanced massive MIMO technology. THz waves, which are known as sub-millimeter radiation, generally indicate a frequency band between 0.1 THz and 10 THz with the corresponding wavelengths in the range of 0.03 mm-3 mm. A band range of 100 GHz to 300 GHz (sub THz band) is regarded as a main part of the THz band for cellular communication. When the sub-THz band is added to the mm Wave band, the 6G cellular communication capacity increases. 300 GHz-3 THz among the defined THz band is in a far infrared (IR) frequency band. Although the 300 GHz-3 THz band is part of the optical band, it is at the border of the optical band and is immediately after the RF band. Therefore, this 300 GHz-3 THz band shows similarity with RF.

FIG. 12 illustrates an example of an electromagnetic spectrum.

The main characteristics of THz communication include (i) a bandwidth widely available to support a very high data transfer rate and (ii) a high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Through this, an advanced adaptive arrangement technology capable of overcoming a range limitation can be used.

Optical Wireless Technology

Optical wireless communication (OWC) technologies are envisioned for 6G communication in addition to RF based communications for all possible device-to-access networks. These networks access network-to-backhaul/fronthaul network connectivity. The OWC technologies have already been used since 4G communication systems, but will be used more widely to meet the demands of the 6G communication system. The OWC technologies, such as light fidelity, visible light communication, optical camera communication, and FSO communication based on the optical band, are already well-known technologies. Communications based on wireless optical technologies can provide very high data rates, low latencies, and secure communications. LiDAR, which is also based on the optical band, is a promising technology for very high-resolution 3D mapping in 6G communications.

FSO Backhaul Network

Characteristics of a transmitter and a receiver of the FSO system are similar to characteristics of an optical fiber network. Therefore, data transmission of the FSO system similar to that of the optical fiber system. Accordingly, FSO can be a good technology for providing backhaul connectivity in the 6G system along with the optical fiber network. If FSO is used, very long-distance communication is possible even at a distance of 10,000 km or more. FSO supports massive backhaul connectivity for remote and non-remote areas such as sea, space, underwater, and isolated islands. FSO also supports cellular BS connectivity.

Massive MIMO Technology

One of core technologies for improving spectral efficiency is to apply MIMO technology. When the MIMO technology is improved, the spectral efficiency is also improved. Therefore, massive MIMO technology will be important in the 6G system. Since the MIMO technology uses multiple paths, multiplexing technology and beam generation and management technology suitable for the THz band should be significantly considered so that data signals can be transmitted through one or more paths.

Block Chain

A block chain will be an important technology for managing large amounts of data in future communication systems. The block chain is a form of distributed ledger technology, and the distributed ledger is a database distributed across numerous nodes or computing devices. Each node duplicates and stores the same copy of the ledger. The block chain is managed by a P2P network. This may exist without being managed by a centralized institution or server. Block chain data is collected together and is organized into blocks. The blocks are connected to each other and protected using encryption. The block chain completely complements large-scale IoT through improved interoperability, security, privacy, stability, and scalability. Accordingly, the block chain technology provides several functions such as interoperability between devices, high-capacity data traceability, autonomous interaction of different IoT systems, and large-scale connection stability of 6G communication systems.

3D Networking

The 6G system integrates the ground and air networks to support communications for users in the vertical extension. The 3D BSs will be provided by low-orbit satellites and UAVs. The addition of new dimensions in terms of height and the associated degrees of freedom makes 3D connectivity significantly different from traditional 2D networks.

Quantum Communication

Unsupervised reinforcement learning in networks is promising in the context of 6G networks. Supervised learning approaches will not be practical for labeling large amounts of data generated in 6G. Unsupervised learning does not require labeling. Therefore, this technique can be used to create the representations of complex networks autonomously. By combining reinforcement learning and unsupervised learning, it is possible to operate the network truly autonomously.

Unmanned Aerial Vehicle

An unmanned aerial vehicle (UAV) or drone will be an important factor in 6G wireless communication. In most cases, a high-speed data wireless connection is provided using UAV technology. A BS entity is installed in the UAV to provide cellular connectivity. The UAVs have specific features, which are not found in fixed BS infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC, and mMTC. The UAV can also support a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Cell-Free Communication

The tight integration of multiple frequencies and different communication technologies is very important in 6G systems. As a result, the user can move seamlessly from one network to another network without the need for making any manual configurations in the device. The best network is automatically selected from the available communication technology. This will break the limits of the concept of cells in wireless communications. Currently, the user's movement from one cell to another cell causes too many handovers in dense networks, and also causes handover failures, handover delays, data losses, and the ping-pong effect. The 6G cell-free communications will overcome all these and provide better QoS. Cell-free communication will be achieved through multi-connectivity and multi-tier hybrid techniques and by different and heterogeneous radios in the devices.

Integration of Wireless Information and Energy Transfer (WIET)

WIET uses the same field and wave as a wireless communication system. In particular, a sensor and a smartphone will be charged using wireless power transfer during communication. WIET is a promising technology for extending the life of battery charging wireless systems. Therefore, devices without battery will be supported in 6G communication.

Integration of Sensing and Communication

An autonomous wireless network is a function for continuously detecting a dynamically changing environment state and exchanging information between different nodes. In 6G, sensing will be tightly integrated with communication to support autonomous systems.

Integration of Access Backhaul Network

In 6G, the density of access networks will be enormous. Each access network is connected by optical fiber and backhaul connectivity such as FSO network. To cope with a very large number of access networks, there will be a tight integration between the access and backhaul networks.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram beamforming (HBF) is a new beamforming method that differs significantly from MIMO systems because this uses a software-defined antenna. HBF will be a very effective approach for efficient and flexible transmission and reception of signals in multi-antenna communication devices in 6G.

Big Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Large Intelligent Surface (LIS)

In the THz band signal, since the straightness is strong, there may be many shaded areas due to obstacles. By installing the LIS near these shaded areas, LIS technology, that expands a communication area, enhances communication stability, and enables additional optional services, becomes important. The LIS is an artificial surface made of electromagnetic materials, and can change propagation of incoming and outgoing radio waves. The LIS can be viewed as an extension of massive MIMO, but is different from the massive MIMO in an array structure and an operating mechanism. Further, the LIS has an advantage such as low power consumption, because this operates as a reconfigurable reflector with passive elements, that is, signals are only passively reflected without using active RF chains. In addition, since each of the passive reflectors of the LIS has to independently adjust the phase shift of an incident signal, this may be advantageous for wireless communication channels. By properly adjusting the phase shift through an LIS controller, the reflected signal can be collected at a target receiver to boost the received signal power.

Terahertz (THz) Wireless Communication General

THz wireless communication uses wireless communication using a THz wave having a frequency of approximately 0.1 to 10 THz (1 THz=1012 Hz) and may refer to THz band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays, has a shorter wavelength than the RF/millimeter wave to have high straightness, and is capable of beam convergence. In addition, the photon energy of the THz wave is only a few meV and thus is harmless to the human body. A frequency band which is expected to be used for THz wireless communication may be D-band (110 GHz to 170 GHz) or H-band (220 GHz to 325 GHz) band with a low propagation loss due to molecular absorption in air. Standardization discussion on THz wireless communication is being discussed mainly in IEEE 802.15 THz working group in addition to 3GPP, and standard documents issued by a task group of IEEE 802.15 (e.g., TG3d, TG3e) can specify and supplement the description of the present disclosure. The THz wireless communication may be applied to wireless cognition, sensing, imaging, wireless communication, THz navigation, etc.

FIG. 13 illustrates an example of a THz communication application.

As illustrated in FIG. 13, a THz wireless communication scenario may be classified into a macro network, a micro network, and a nanoscale network. In the macro network, THz wireless communication may be applied to vehicle-to-vehicle connectivity and backhaul/fronthaul connectivity. In the micro network, THz wireless communication may be applied to near-field communication such as indoor small cells, fixed point-to-point or multi-point connection such as wireless connection in a data center, and kiosk downloading.

Table 2 below shows an example of technology which can be used in the THz wave.

TABLE 2

| | |
|---|---|
| Transceivers Device | Available immature: UTC-PD, RTD and SBD |
| Modulation and coding | Low order modulation techniques (OOK, QPSK), LDPC, Reed Soloman, Hamming, Polar, Turbo |
| Antenna | Omni and Directional, phased array with low number of antenna elements |
| Bandwidth | 69 GHz (or 23 GHz) at 300 GHz |
| Channel models | Partially |
| Data rate | 100 Gbps |
| Outdoor deployment | No |
| Free space loss | High |
| Coverage | Low |
| Radio Measurements | 300 GHz indoor |
| Device size | Few micrometers |

THz wireless communication can be classified based on a method for generating and receiving THz. The method of generating THz can be classified as an optical device or an electronic device-based technology.

FIG. 14 illustrates an example of an electronic device-based THz wireless communication transceiver.

The method of generating THz using an electronic device includes a method using a semiconductor device such as a resonant tunneling diode (RTD), a method using a local oscillator and a multiplier, a monolithic microwave integrated circuit (MMIC) method using a compound semiconductor high electron mobility transistor (HEMT) based integrated circuit, a method using a Si-CMOS based integrated circuit, and the like. In FIG. 14, a multiplier (e.g., doubler, tripler) is applied to increase the frequency, and radiation is performed by an antenna via a subharmonic mixer. Since the THz band forms a high frequency, the multiplier is essential. Here, the multiplier is a circuit that allows the frequency to have an output frequency which is N times an input frequency, and the multiplier matches a desired harmonic frequency and filters out all the remaining frequencies. In addition, beamforming may be implemented by applying an array antenna or the like to the antenna of FIG. 14. In FIG. 14, IF denotes an intermediate frequency, a tripler and a multiplier denote a multiplier, PA denotes a power amplifier, LNA denotes a low noise amplifier, and PLL denotes a phase-locked loop.

FIG. 15 illustrates an example of a method of generating an optical device-based THz signal.

FIG. 16 illustrates an example of an optical device-based THz wireless communication transceiver.

The optical device-based THz wireless communication technology refers to a method of generating and modulating a THz signal using an optical device. The optical device-based THz signal generation technology refers to a technology that generates an ultrahigh-speed optical signal using a laser and an optical modulator and converts it into a THz signal using an ultrahigh-speed photodetector. This technology is easy to increase the frequency compared to the technology using only the electronic device, can generate a high-power signal, and can obtain a flat response characteristic in a wide frequency band. In order to generate the optical device-based THz signal, as illustrated in FIG. 15, a laser diode, a broadband optical modulator, and an ultrahigh-speed photodetector are required. In FIG. 15, light signals of two lasers having different wavelengths are combined to generate a THz signal corresponding to difference in a wavelength between the lasers. In FIG. 15, an optical coupler refers to a semiconductor device that transmits an electrical signal using light waves to provide coupling with electrical isolation between circuits or systems, and a uni-travelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 16, an erbium-doped fiber amplifier (EDFA) denotes an optical fiber amplifier to which erbium is added, a photo detector (PD) denotes a semiconductor device capable of converting an optical signal into an electrical signal, and OSA denotes an optical sub assembly in which various optical communication functions (e.g., photoelectric conversion, electrophotic conversion, etc.) are modularized as one component, and DSO denotes a digital storage oscilloscope.

A structure of a photoelectric converter is described with reference to FIGS. 18 and 19.

FIG. 17 illustrates a structure of a photoinc source-based transmitter.

FIG. 18 illustrates a structure of an optical modulator.

Generally, an optical source of a laser may change a phase of a signal by passing through an optical wave guide. In this instance, data is carried by changing electrical characteristics through a microwave contact, or the like. Thus, an optical modulator output is formed in the form of a modulated waveform. A photoelectric modulator (O/E converter) may generate THz pulses based on an optical rectification operation by a nonlinear crystal, a photoelectric conversion (O/E conversion) by a photoconductive antenna, and emission from a bunch of relativistic electrons. The THz pulse generated in the above manner may have a length of a unit from femto second to pico second. The photoelectric converter (O/E converter) performs down-conversion using non-linearity of the device.

Considering THz spectrum usage, multiple contiguous GHz bands are likely to be used as fixed or mobile service usage for the terahertz system. According to outdoor scenario criteria, an available bandwidth may be classified based on oxygen attenuation 10ˆ2 dB/km in the spectrum of up to 1 THz. Hence, a framework in which the available bandwidth consists of several band chunks may be considered. As an example of the framework, if the length of the THz pulse for one carrier is set to 50 ps, the bandwidth (BW) is about 20 GHz.

The effective down-conversion from the infrared (IR) band to the THz band depends on how to utilize the nonlinearity of the photoelectric converter (O/E converter). That is, for down-conversion into a desired THz band, design of the photoelectric converter (O/E converter) having the most ideal non-linearity to move to the corresponding THz band is required. If a photoelectric converter (O/E converter) which is not suitable for a target frequency band is used, there is a high possibility that an error occurs with respect to an amplitude and a phase of the corresponding pulse.

In a single carrier system, a THz transmission/reception system may be implemented using one photoelectric converter. In a multi-carrier system, as many photoelectric converters as the number of carriers may be required, which may vary depending on the channel environment. Particularly, in a multi-carrier system using multiple broadbands according to the plan related to the above-described spectrum usage, the phenomenon will be prominent. In this regard, a frame structure for the multi-carrier system may be considered. A down-frequency-converted signal based on the photoelectric converter may be transmitted in a specific resource area (e.g., a specific frame). The frequency domain of the specific resource area may include a plurality of chunks. Each chunk may consist of at least one component carrier (CC).

Quantum Cryptography Communication

FIG. 19 schematically shows an example of quantum cryptography communication.

According to FIG. 19, a quantum key distribution (QKD) transmitter 1910 may perform communication by being connected to a QKD receiver 1920 through a public channel and a quantum channel.

At this time, the QKD transmitter 1910 may supply a secret key to an encryptor 1930, and the QKD receiver 1920 may also supply the secret key to a decoder 1940. Here, a plain text may be input/output to the encryptor 1930, and the encryptor 1930 may transmit data encrypted with a secret symmetric key to the decoder 1940 (via an existing communication network). In addition, the plain text may also be input/output to the decoder 1940.

The quantum cryptography communication is described in more detail as follows.

In the quantum cryptography communication system, unlike conventional communication methods that communicate using wavelengths or amplitudes, signals are carried using a single photon, the smallest unit of light. While most conventional cryptography systems are guaranteed stability by the complexity of mathematical algorithms, the quantum cryptography communication is based on the unique properties of quantum, so the stability is guaranteed as long as the physical laws of quantum mechanics are not broken.

The most representative quantum key distribution protocol is the BB84 protocol proposed by C. H. Bennett and G. Brassard in 1984. The BB84 protocol carries information on the state of the photon's polarization and phase, and by using the characteristics of quantum, in theory, it is possible to share the secret key (sift key) absolutely safely. Table 3 shows an example of the BB84 protocol that generates a secret key by loading information on the polarization state between Alice on the transmitting side and Bob on the receiving side, and the overall flow of the BB84 protocol is as follows.

(1) Alice randomly generates bits.

(2) Alice randomly selects a transmission polarizer to determine which polarization to carry the bit information.

(3) Alice generates a polarization signal corresponding to the randomly generated bit in 1 and the randomly selected polarizer in 2 and transmits the polarization signal to the quantum channel.

(4) Bob randomly selects a measurement polarizer to measure the polarization signal transmitted by Alice.

(5) Bob measures the polarization signal transmitted by Alice with the selected polarizer and stores the polarization signal.

(6) Alice and Bob share which polarizer Alice and Bob use through the classic channel.

(7) Alice and Bob obtain the secret key by keeping only the bits that use the same polarizer and removing the bits that use different polarizers.

TABLE 3

| Bits generated by Alice | 0 | 1 | 1 | 0 | 1 | 0 | 0 | 1 |
|---|---|---|---|---|---|---|---|---|
| Transmission polarizer selected by Alice | + | + | x | + | x | x | x | + |
| Polarization signal transmitted by Alice | ↑ | → | ↙ | ↑ | ↙ | ↗ | ↗ | → |
| Measurement polarizer selected by Bob | + | x | x | x | + | x | + | x |
| Polarization signal measured by Bob | ↑ | ↗ | ↙ | ↗ | → | ↗ | → | → |
| Verifying whether transmission polarizer and measurement polarizer match | Data exchange through classical channel | | | | | | | |
| Finally generated secret key | 0 | | 1 | | | 0 | | 1 |

DETAILED DESCRIPTION OF VARIOUS EMBODIMENTS OF THE PRESENT DISCLOSURE

Hereinafter, various embodiments of the present disclosure will be described in more detail.

The symbols/abbreviations/terms used in the present disclosure are as follows.

QSDC: Quantum Secure Direct Communication
QBER: Quantum Bit Error Rate
QKD: Quantum Key Distribution
LD: Laser Diode
SPD: Single Photon Detector
Po_M: Polarization Modulator
Po_R: Polarization Rotator
VOA: Variable Optical Attenuator
BS: Beam splitter
PBS: Polarization beam splitter
BSM: Bell State Measurement
EPR-pair: Einstein-Podolsky-Rosen pair
QRNG: Quantum random number generator The present disclosure relates to a quantum secure direct communication (QSDC) technique that can safely transmit message information directly through a quantum channel among quantum communication techniques, and discloses a method and a device for reducing the complexity of a receiver of an entanglement-based two-step QSDC protocol as a representative technique. Particularly, the present disclosure discloses a method and a device which can reduce a configuration complexity of a receiver, which can detect a received entanglement signal by a low-complexity individual single-photon detection scheme without using a quantum memory and a bell state measurement method used to detect an entanglement state signal including message information by a receiver of an entanglement light source based two step QSDC protocol, and then detect classical message information to be transmitted through checking whether the results match.

Background Art of Various Embodiments of the Present Disclosure

FIG. 20 is a diagram illustrating an example of a two step QSDC configuration in a system applicable to the present disclosure.

The two step QSDC technique based on an existing entangled light source is based on a technique that can transmit 2 bits of classic information to 1 qubit information which is quantum super dense coding, and transmits a pair of entangled photons in two stages rather than sending them all at once. This is to verify safety from hacking by sending one of the entangled photon pair first and then sending the other half. In order to eavesdrop on an entangled light source, it is necessary to know the information on both sides of the entangled photon pair, and if the safety of one side is guaranteed, even if the other side is eavesdropped, the eavesdropper may not accurately determine the state of the entangled photon pair. Therefore, safety may be guaranteed through this. Therefore, if safety is confirmed through this process, the message information to be sent to the remaining photon pair is coded and transmitted, and classic information may be detected by measurement at the receiver. The configuration method and overall structure of the two step QSDC technique are shown in FIG. 20, and each element used performs the following roles.

(1) SR1~4: Optical delay line that servers as quantum memory (2) CE1, 2: Part that checks for the presence of eavesdroppers (3) CM: Part that encodes the classical message information to be transmitted from Alice to Bob (4) EPR-source: Part that generates the entanglement light source (5) Bell state measurement: Part that measures the entanglement light source FIG. 21 is a diagram illustrating an example of an EPR pair change process in a two-step QSDC protocol in a system applicable to the present disclosure.

Conventional Two Step QSDC Protocol

An exemplary conventional two step QSDC protocol is as follows.

Step 1: Alice and Bob map 2 bits of classic information to the following four Bell basis as shown in Equation 1 below.

$$|\Psi-\rangle = \frac{1}{\sqrt{2}}(|0\rangle_C|1\rangle_M - |1\rangle_C|0\rangle_M) \rightarrow 00 \quad \text{[Equation 1]}$$

$$|\Psi+\rangle = \frac{1}{\sqrt{2}}(|0\rangle_C|1\rangle_M + |1\rangle_C|0\rangle_M) \rightarrow 01$$

-continued $$|\phi-\rangle = \frac{1}{\sqrt{2}}(|0\rangle_C|0\rangle_M - |1\rangle_C|1\rangle_M) \rightarrow 10$$

$$|\phi+\rangle = \frac{1}{\sqrt{2}}(|0\rangle_C|0\rangle_M + |1\rangle_C|1\rangle_M) \rightarrow 11$$

Step 2: Alice prepares the same N entangled photon pairs (EPR source) as shown in Equation 2 below.

$$|\Psi-\rangle = \frac{1}{\sqrt{2}}(|0\rangle_C|1\rangle_M - |1\rangle_C|0\rangle_M) \quad \text{[Equation 2]}$$

Step 3: Alice sends a particle corresponding to the C-sequence (=Checking sequence) in FIG. 1 among respective entangled photon pairs to Bob. C-sequence is constituted by N particles, and is denoted as $[P_1(C), P_2(C), P_3(C), \ldots, P_N(C)]$.

Step 4: Bob randomly selects some of the received C-sequences and transmits the selected location information to Alice through the classical channel.

Step 5: Bob randomly selects one of the two measurement bases to measure photons at the selected location.

Step 6: Bob transmits the basis and measurement value used for measurement to Alice through the classical channel.

Step 7: Alice measures the M-sequence (=Message sequence) using the same basis as Bob, then compares the result with Bob's received measurement value to obtain the Quantum bit error rate (QBER). The QBER may be obtained through a ratio of mismatched measured values among the measured values.

Step 8: When the QBER is lower than an eavesdropping reference value, a next process continues because there is no eavesdropper in an upper quantum channel, and when the QBER is higher than the eavesdropping reference value, the transmitted information is hacked, so the transmitted C-sequence information is discarded.

The process from step 4 to step 8 is the process of safely transmitting the part corresponding to the checking sequence, which is one particle of the entangled photon pair, from the eavesdropper. In order for the eavesdropper to detect the signal generated by the entangled light source, Bell state measurement must be performed using the two particles that make up the entangled photon pair. Therefore, the QSDC protocol uses the characteristics to ensure the safety of the entire communication process by ensuring the safety of the checking sequence transmitted initially.

Step 9: When the C-sequence transmitted through the upper quantum channel is safely transmitted, Alice encodes the classical message to be transmitted in the M-sequence.

Step 10: In order to encode the message onto the EPR pair, one of the four unitary operations $U_0$, $U_1$, $U_2$ and $U_3$ is applied to convert an initial entangled photon pair $|\psi^-\rangle$ into one of $|\psi^-\rangle$, $|\psi^+\rangle$, $|\phi^+\rangle$, and $|\phi^-\rangle$. Four exemplary unitary operations are shown in Equation 3 below.

$$U_0 = I = |0\rangle\langle 0| + |1\rangle\langle 1|, \quad \text{[Equation 3]}$$

$$U_1 = \sigma_z = |0\rangle\langle 0| - |1\rangle\langle 1|,$$

$$U_2 = \sigma_x = |1\rangle\langle 0| + |0\rangle\langle 1|,$$

$$U_3 = i\sigma_y = |0\rangle\langle 1| - |1\rangle\langle 0|$$

Step 11: The encoded message sequence is transmitted to Bob.

Step 12: Bob performs Bell state measurement using the previously transmitted C-sequence stored in SR1,3 and the subsequently transmitted M-sequence information.

Step 13: Alice transmits the location of sample information to be used to check whether eavesdropping is made among the message sequence sent to Bob and the type of unitary operation applied to the sample information through the classical channel.

Step 14: Bob may estimate the QBER of the M-sequence through QBER estimation for the sample selected by Alice.

Step 15: It is determined whether error correction is possible based on the QBER of the M sequence. If error recovery is possible based on classical error correction codes, an error correction process is performed to restore the transmitted message information, otherwise, the process is restarted from the beginning.

The process from steps 1 to 15 described above may be expressed again as movement and state change of the entangled photon pairs in the transmitter and receiver, as shown in FIG. 21.

In the initial Alice, an entanglement light source, EPR-pair, is created. At this time, $P_i(1)$ refers to the message coding sequence and $P_i(2)$ refers to the checking sequence. Next, the checking sequence is transmitted to Bob. At this time, some information is lost due to channel loss during the transmission process, and this part corresponds to a white part. Next, Alice encodes the message information in the message coding sequence. Four colors mean conversion to one of four EPR-pairs. Finally, the converted entangled photon is received towards Bob, and the transmitted message information is obtained by performing Bell state measurement on the converted entangled photon pair.

(Reference document: Two-step quantum direct communication protocol using the Einstein-Podolsky-Rosen pair block, Fu-Guo Deng, Gui Lu Long, and Xiao-Shu Liu, Phys. Rev. A 68, 042317, 2003)

The technical problems that various embodiments of the present disclosure seek to solve are as follows:

Because quantum memory and Bell state measurement techniques were used in the measurement process of the existing two step QSDC protocol, configuration complexity was high.

(Problem 1 of the prior art) The complete Bell state measurement (complete BSM) technique has higher configuration complexity than the single-photon measurement technique.

FIG. 22 is a diagram illustrating an example of partial Bell state measurement (partial BSM) in a system applicable to the present disclosure.

FIG. 23 is a diagram illustrating an example of complete Bell state measurement (complete BSM) in the system applicable to the present disclosure.

The Bell state measurement as a scheme used to measure the EPR pair may be measured by distinguishing four states $|\psi^-\rangle$, $\psi^+\rangle$, $|\phi^+\rangle$, and $|\phi^-\rangle$.

FIG. 22 illustrates a partial Bell state measurement technique that may distinguish $|\psi^-\rangle$ and $|\psi^+\rangle$ among four Bell states.

FIG. 23 illustrates a complete Bell state measurement technique that may distinguish all of the four Bell states.

As can be seen in FIG. 22, four Bell states may not be completely distinguished in a detection process only by a configuration method through a difference in detection path according to polarization constituted by one BS, two PBSs, and four detectors. Therefore, as illustrated in FIG. 23, the four states may be distinguished by additionally utilizing time information. However, in the method of FIG. 23, the use of additional resources such as a time delay path is required for complete distinguishing, so it can be seen that the configuration complexity of the detection process increases compared to FIG. 3.

(Reference document: Superdense Coding over Optical Fiber Links with Complete Bell-State Measurements, Brian P. Williams, Ronald J. Sadlier, and Travis S. Humble, Phys. Rev. Lett. 118, 050501, 2017)

Since the two step QSDC protocol uses all four EPR pairs, the Complete Bell state measurement technique illustrated in FIG. 23 must be used, so the complexity of the receiver is high. However, in the two step QSDC technique, the EPR pair is not transmitted at once, but one particle of the pair is transmitted first, and after checking for eavesdropping, the particle corresponding to the other side is transmitted, so the Bell state measurement technique, which is a measurement method when the EPR pair is received at the same time, need not be used. Therefore, if individual particles of the EPR pair transmitted at different times are received using a low-complexity single-photon measurement method, the complexity of the receiver may be reduced.

(Problem 2 of the prior art) Quantum memory must be used to store the checking sequence initially transmitted from the receiver, but the current optical quantum memory has a very short storage time of up to several ms, so optical delay lines are mainly used as an alternative, but since the required length of the optical delay line is more than three times the channel length, this causes the problem of the size of the receiver becoming very large, and as the length of the delay line increases, information loss due to fiber loss also increases, thereby shortening the actual transmission distance of quantum information.

In the existing two step QSDC protocol, the checking sequence of the EPR pair is transmitted first, then safety is verified, and when safety is secured, the message coding sequence is subsequently transmitted, and the classical message information is transmitted by measuring using the two sequences, so until the message sequence reaches the receiver after the checking sequence is received, the message sequence must be stored in the quantum memory. In the initial two step QSDC technique, the storage time required for quantum memory is defined as t, and a minimum value thereof is expressed in the equation below. In other words, assuming the channel length is L, after the checking sequence is transmitted, additional information must be exchanged through the classic channel and the message coding sequence must be subsequently transmitted, so it can be seen that a minimum time of 3 times the channel length is required.

$$\tau \geq \frac{3L}{C} + \frac{N}{f} \qquad \text{[Equation 4]}$$

($\tau$: quantum memory storage time, L: channel length, C: photon speed, N: number of generated EPR pairs included in a single block, f: number of photons transmitted per unit time)

However, the current quantum memory implementation technology is difficult to use because the maximum storage time is so short that the maximum storage time is only a few ms, so optical delay lines are mainly used in QSDC implementation. However, as mentioned above, a very large optical delay line that is more than three times the length of the transmission channel is required, and considering that the loss per distance of the optical cable is 0.2 dB/km, it can be seen that the longer the transmission distance, the more information loss occurs. And because the distance loss causes information loss of more than three times the actual distance for transmitting quantum information, the transmission distance of quantum information is shortened. Therefore, the development of a QSDC method that may minimize or eliminate the use of quantum memory is required.

Configuration of Various Embodiments of the Present Disclosure

The present disclosure presents a method and device for reducing the complexity of the receiver of the existing entangled light source-based two step quantum secure direct communication protocol while minimizing information loss during the reception process. For this purpose, in this patent, proposed is a scheme in which instead of the Bell state measurement technique used as the measurement method of the entangled state in the receiver, a single photon measurement technique is used to first measure the checking sequence among entangled photon pairs and later measure the message coding sequence containing classical message information, and then receive message information based on whether the measured values match. In addition, in this process, a method that does not use the quantum memory used to store the checking sequence of the receiver is jointly presented.

The entire process of the method according to various embodiments of the present disclosure will be described in order as follows.

Entire Process of Two Step QSDC Protocol that does not Use Quantum Memory and Bell State Measurement in Receiver FIG. 24 is a diagram illustrating an example of a two step QSDC in which the quantum memory and the BSM of the receiver are omitted in the system applicable to the present disclosure.

Specifically, FIG. 24 illustrates a block diagram of the polarization-based two step QSDC protocol proposed in the present disclosure, and the progress is as follows.

Step 1: creates N entangled photon pairs (EPR-pairs). As illustrated in FIG. 24, the entangled photon pair $|^{-}|\psi^{-}\rangle$ is divided into a checking sequence that checks whether the quantum channel is being eavesdropped and a message coding sequence that is used to code classical message information to be transmitted from the transmitter to the receiver. The configuration of the entangled photon pair $|\psi^{-}\rangle$ is given in Equation 5 below.

$$|\Psi-\rangle = \frac{1}{\sqrt{2}}(|0\rangle_C|1\rangle_M - |1\rangle_C|0\rangle_M) \qquad \text{[Equation 5]}$$

Step 2: Alice sends the checking sequence to Bob through a 1st quantum channel, and Bob randomly selects a basis to be measured (Choose between Rectilinear or diagonal basis).

Step 3: Bob randomly selects and measures some of the receiving checking sequences, then transmits the measurement location, basis information, and measurement value to Alice through the 1st classical channel, and first detects the remaining location information to be used for receiving the message information later, and then stores the detected result. At this time, since the stored value is not a quantum state but a classic information value, the stored value is also stored in a general memory (e.g. RAM or register, etc.).

Step 4: Alice detects the result by measuring information at the same location as the location transmitted through the classic channel in step 3 of the message coding sequence using the same basis as Bob. The measurement results in steps 3 and 4 are compared to obtain the quantum bit error rate (QBER).

When the QBER does not exceed a threshold that determines whether eavesdropping occurs, the initially transmitted checking sequence is guaranteed to be safe from eavesdroppers, so the next process proceeds, and in other cases, it is indicated that eavesdropping occurs, so the transmission process is stopped.

Step 5: If the information on one side of the entangled photon pair transmitted to the 1st quantum channel is safe, even if the information on the other side is eavesdropped, it is impossible for the eavesdropper to accurately infer the state of all entangled photons, so the next process proceeds. Therefore, while checking the safety of the checking sequence, the classical message information to be transmitted is encoded in the message coding sequence stored in the quantum memory of the transmitter. In classic information coding, I (=Identity operation) is used when transmitting 0, and U (Unitary operation) is used when transmitting 1. An exemplary configuration of coding of classic information is shown in Equation 6 below.

Then, random classical binary information generated from QRNG, excluding the message transmission value, is mixed at random location between message information, encoded, and transmitted, and this value is used to measure the QBER of the 2nd quantum channel in the 8th process.

$$I = |0\rangle\langle 0| + |1\rangle\langle 1| \leftarrow \text{bit: } 0 \qquad \text{[Equation 6]}$$

$$U = |0\rangle\langle 1| - |1\rangle\langle 0| \leftarrow \text{bit: } 1$$

Step 6: Using the same basis information measured in step 2, Bob measures the value of the transmitted encoded message coding sequence.

Step 7: Bob detects the measurement result using a single-photon detector.

Step 8: In order to estimate the error rate of the 2nd quantum channel, Alice transmits the location and transmitted value of random classical binary information mixed with the encoded message sequence to Bob through the 2nd classical channel. Bob estimates the QBER by comparing the results measured at the same location as Alice.

After estimating the QBER, it is determined whether error correction is possible based on the error rate. At this time, a channel coding technique such as an LDPC code is used to correct channel errors, and if the error rate exceeds the error correction ability of the error correction code, the transmission process is stopped because restoration of the original message information is impossible, and when the error rate is lower than the error correction capability, error correction is possible, so in this case, the transmitted message information is restored through the error correction process.

Step 9: By comparing the measured value of the checking sequence that is not used for QBER estimation in step 3 and the result of the message coding sequence obtained through step 8, it may be known whether the message coding sequence is converted in step 5, so through this, it is determined whether the classic information sent from Alice to Bob is 0 or 1.

If the values of the two sequences match, it is determined that classic information of 0 is transmitted, and if the values of the two sequences do not match, it is determined that classic information of 1 is transmitted.

FIG. 25 is a diagram illustrating an example of the configuration of a polarization-based two-step QSDC protocol in the system applicable to the present disclosure.

Specifically, FIG. 25 is a diagram illustrating an example of a process for configuring a polarization-based two step QSDC protocol using an optical element, an entangled light source generation, and a detector according to various embodiments of the present disclosure. In various embodiments of the present disclosure, the two step QSDC protocol is configured using a method of transmitting and detecting classic information using the polarization state of photons.

Method of Configuring Two-Step QSDC Protocol that does not Use Quantum Memory and Bell State Measurement in Receiver Using Polarization State of Photons FIG. 26 is a diagram illustrating an example of a process for generating entangled photons using a spontaneous parametric down conversion (SPDC) scheme in the system applicable to the present disclosure.

(1) Generation and Transmission Process of Entangled Photon Pair at Transmitter Node (ALICE)

Various embodiments of the present disclosure use the Spontaneous Parametric down conversion (SPDC) scheme, which is mainly used in quantum communication, in order to generate an entangled photon pair. The entangled photon pair generation scheme using the SPDC uses a principle that when a laser beam is incident on a non-linear medium such as Beta barium borate (BBO), each photon in the beam is split into two and a photon pair with half the frequency is formed with a correlation to generates a photon pair with the entanglement relationship illustrated in FIG. 26.

Among the generated entangled photon pairs, the checking sequence is first transmitted and checked for eavesdropping, and during this process, the message coding sequence, which is the remaining part of the entangled photon pair, is stored in an optical delay line (ODL), which is used as the quantum memory. In respect to the length of the ODL, the message coding sequence stored as long as the time used for transmission of the checking sequence and QBER estimation is safe from eavesdropping, message information to be transmitted is encoded through polarization coding.

(2) Individual Detection Process of Entangled Photon Pair at Receiver Node (BOB)

At the receiver node, pairs of entangled photons are not received at the same time, and the single photon corresponding to the checking sequence among the photon pairs is transmitted first, and then the entangled photon corresponding to the message sequence is transmitted, so it is also possible to detect the transmitted classic information by the single photon detection scheme other than the existing Bell state measurement.

Step 1: Polarization Information Detection Process of Checking Sequence

The detection process of the checking sequence begins with what basis polarization rotator 1 measures. The value of 0 may be a change in polarization of 0 degrees or −45 degrees, and 0 degree means that information measured using an orthogonal basis is received, and −45 degrees means that information measured using a diagonal basis is received.

Therefore, after measurement, the polarization state just before the PBS has only one component of 0 degree and 90 degrees, and the path after passing through the PBS is determined as one of the two paths, up or down, depending on which polarization state the polarization state has among the two polarization components. The values measured in the upper path mean that the initial transmission information is 0, and those transmitted in the lower path mean that the transmission information has a polarization state of 1, and after being detected by the SPD, it is distinguished whether the value is 0 or 1 through the time information measured by the TDC, and stored in the memory.

Step 2: Polarization Information Detection Process of Message Coding Sequence

The message coding sequence is detected using the same basis information as the checking sequence. This is because the previously sent checking sequence and the message coding sequence are correlated with each other, so correct measurements may be made on the same basis. Therefore, the difference from the detection process of the checking sequence is that the message coding sequence uses a scheme that uses the same previously selected basis rather than the random basis selection scheme. After that, the measurement process of the polarization information is the same as the detection process of the checking sequence.

Step 3:1 Bit Classic Information Detection Process Through Comparison of Two Single Photon Pairs By comparing the measured polarization states of the checking sequence and the message coding sequence, it is possible to distinguish whether the classical message information transmitted from the transmitter is 0 or 1. In this case, when the polarization states of the two initially correlated entangled photon pairs are the same, if the polarization component of the entangled photon component corresponding to the message coding sequence is changed in the message coding step, a characteristic that values of two sequences measured in the same basis by the receiver do not match is used. Therefore, when the message to be transmitted is 0, the polarization state of the message sequence is not changed, so when detected by the receiver, the detection results of the two sequences are the same. And when the message to be transmitted is 1, the polarization state of the message sequence is changed, so the results of the two sequences individually detected by the receiver do not match. Using this, the present disclosure may transmit 1 bit of information per entangled photon pair.

Exemplary Operation Process of Network Node

An exemplary operation process of a network node according to various embodiments of the present disclosure is as follows. The network node according to various embodiments of the present disclosure may correspond to the receiver node (BOB). However, in some cases, the network node according to various embodiments of the present disclosure may also correspond to the transmitter node (ALICE).

Various embodiments of the present disclosure aim to reduce the complexity of the configuration of the receiver in a polarization-based two step quantum safe direct communication technique using entangled photon pairs.

Instead of the existing Bell state measurement technique, which waits until all single photon pairs are received and then measures the entangled photon pairs all at once, the receiver node measures the two particles that make up the single photon pair using individual single photo detection, and then detects transmitted message information by using whether is a difference between both measured values.

(1) The Processing Process of Information Transmitted Through the 1st Quantum Channel Includes the Following Operations.

First, a step of transmitting the checking sequence used as a reference in the transmission process to the receiver without any conversion;

A step in which in the detection process, at the same time when the checking sequence received first is not stored, but received in the quantum memory of the receiver, the checking sequence is first measured using a polarization-based single-photon measurement scheme (QBER estimation step to determine whether the eavesdropper is present); and A step of storing the result measured by the random basis the memory (e.g., the RAM, the register, etc.) which may store the existing digital information.

(2) The Processing Process of Information Transmitted Through the 2nd Quantum Channel Includes the Following Operations.

A step of in which when the safety of the checking sequence is guaranteed, encoding 1 bit classic information based on whether the polarization state of the message coding sequence used for transmission of message information to be transmitted by the transmitter is converted through a unitary operation;

A step of receiving the message coding sequence from the transmitter and measuring the received message coding sequence using the polarization-based single-photon measurement scheme;

A step of measuring the message coding sequence transmitted to the receiver in the above step using the same basis as the checking sequence; and A step of detecting the transmitted 1 bit information at the receiver through whether the measurement result of the checking sequence stored in the memory matches the message coding sequence.

Various embodiments of the present disclosure propose an efficient method for configuring an entanglement-based two step quantum direct communication protocol with low reception complexity.

Expected Effects of Various Embodiments of the Present Disclosure

Various embodiments of the present disclosure propose a method that does not use Bell state measurement and quantum memory to reduce the complexity of the configuration of the receiver of the existing two step QSDC, and to this end, instead of the bell state measurement (BSM) technique used in the existing two step QSDC technique, the single-photon detection technique is used. Accordingly, the configuration complexities of the transmitter of the existing technique and the various embodiments of the present disclosure are the same, but the complexity of the configuration of the receiver may be greatly reduced compared to the existing technique, as shown in Table 4.

In Table 4, the existing two step QSDC (conventional two step QSDC) protocol according to the prior art, which configures the receiver in the complete BSM scheme using FIGS. 20 and 23, is used for complexity comparison. The configuration of the receiver of the two step QSDC (proposed two step QSDC) protocol proposed by various embodiments of the present disclosure follows the configuration scheme based on the single photon detection scheme in FIG. 25.

TABLE 4

| Receiver configuration | Conventional two step QSDC | Proposed two step QSDC |
|---|---|---|
| Optical delay line (Quantum memory) | Use an optical delay line with a length of at least 3 times the minimum channel length | Not used |

TABLE 4-continued

| Receiver configuration | Conventional two step QSDC | Proposed two step QSDC |
|---|---|---|
| Single photon detector | 4 | 2 |
| PBS (polarization beamsplitter) | 3 | 2 |
| BS (beamsplitter) | 2 | Not used |
| HWP (half waveplate) | 2 | Not used |
| Polarization rotator | Not used | 2 |

As can be seen from the results in Table 4, various embodiments of the present disclosure can reduce the number of single-photon detectors used by half without using the optical delay line used as the quantum memory, which is the two bulkiest parts of the receiver, thereby significantly reducing the configuration complexity. In addition, it can be seen that the usage of major small optical elements (single-photon detector, polarization beamsplitter (PBS), beamsplitter (BS), and half waveplate (HWP)) excluding the polarization rotator in the receiver in various embodiments of the present disclosure is significantly reduced compared to the existing technique.

Description Related to First Node Claim

Hereinafter, the above-described embodiments will be described in detail with reference to FIG. 27 in terms of the operation of the first node with respect to the second node. Methods to be described below are just distinguished for convenience and unless the methods mutually exclusive, it is needless to say that some components of any one method may be substituted with some components of another method or may be applied in combination with each other.

FIG. 27 is a diagram illustrating an example of an operation process of a first node in the system applicable to the present disclosure.

According to various embodiments of the present disclosure, a method performed by the first node in the quantum communication system is provided. In the embodiment of FIG. 27, the first node may correspond to Bob and the second node may correspond to Alice. In some cases, the first node may correspond to Alice and the second node may correspond to Bob.

In step S2701, the first node receives a checking sequence from the second node through a first quantum channel, and the checking sequence configures entangled photon pairs (Einstein-Podolsky-Rosen pairs, EPR-pairs) with a message coding sequence.

In step S2702, the first node does not store the checking sequence in the quantum memory, but performs a single-photon measurement based on first basis information for a part corresponding to a first position randomly selected in the checking sequence to determine a first measurement value.

In step S2703, the first node stores information on the first position, the first base information, and the first measurement value in a general memory.

In step S2704, the first node transmits the information on the first position, the first base information, and the first measurement value to the second node through a first classical channel.

In step S2705, the first node receives a message coding sequence in which 1 bit of classical message information is encoded through the second quantum channel.

In step S2706, the first node determines a second measurement value by performing single-photon measurement on the part corresponding to the first position in the message coding sequence based on the first basis information.

In step S2707, the first node detects the classic information based on whether the first measurement value stored in the general memory matches the second measurement value.

According to various embodiments of the present disclosure, the message coding sequence may be received based on the safety of the checking sequence being confirmed from a first quantum bit error rate (QBER) for the first measurement value.

According to various embodiments of the present disclosure, the embodiment of FIG. 27 may further include: determining a second quantum bit error rate (QBER) based on the first measurement value and the second measurement value; and performing restoration of the classical message through error correction based on the second QBER.

According to various embodiments of the present disclosure, the classical message information may be encoded based on whether the polarization state of the message coding sequence is converted through a unitary operation.

According to various embodiments of the present disclosure, the checking sequence and the message coding sequence constituting the entangled quantum pair may be generated by the second device, and the checking sequence may be generated by the second device and then received by the first device without conversion.

According to various embodiments of the present disclosure, the classical message information may be encoded to the message coding sequence after mixing random classical binary information at random locations among the classical message information, the embodiment of FIG. 27 may further include receiving information of the random classical binary information and information of the random locations from the second device through a second classical channel, and the second QBER may be measured further based on the information of the random classical binary information and information of the random locations.

According to various embodiments of the present disclosure, the general memory may be configured to store information in a binary state, and the quantum memory may be configured to store information in a quantum state.

According to various embodiments of the present disclosure, a first node in a quantum communication system is provided. The first node may include: a general memory; a transceiver; and at least one processor, and the at least one processor may be configured to perform the operation method of first node according to FIG. 27.

According to various embodiments of the present disclosure, a device controlling the first node in the quantum communication system is provided. The device includes at least one processor; and at one memory operably accessing to the at least one processor. The at least one memory may be configured to instructions for performing the operation method of the first node according to FIG. 27 based on being executed by the at least one processor.

According to various embodiments of the present disclosure, provided are one or more non-transitory computer-readable media storing one or more instructions. The one or more instructions may perform operations based on being executed by one or more processors, and the operations may include the operation method of the first node according to FIG. 27.

Communication System Applicable to the Present Disclosure

FIG. 28 illustrates a communication system 1 applied to various embodiments of the present disclosure.

Referring to FIG. 28, a communication system 1 applied to various embodiments of the present disclosure includes a wireless device, a base station, and a network. Herein, the wireless device refers to a device performing communication using Radio Access Technology (RAT) (e.g., 5G New RAT (NR)) or Long-Term Evolution (LTE)) and may be referred to as communication/radio/5G device. Although not limited thereto, the wireless devices may include a robot 100*a*, vehicles 100*b*-1 and 100*b*-2, an extended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BS and the network may be implemented as wireless devices and a specific wireless device 200*a* may operate as a BS/network node with respect to other wireless devices.

The wireless devices 100*a* to 100*f* may be connected to the network 300 via the BS 200. An Artificial Intelligence (AI) technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BS 200/network 300, the wireless devices 100*a* to 100*f* may perform direct communication (e.g., sidelink communication) with each other without passing through the BS/network. For example, the vehicles 100*b*-1 and 100*b*-2 may perform direct communication (e.g. Vehicle-to-Vehicle (V2V)/Vehicle-to-everything (V2X) communication). Additionally, the IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BS/the wireless device, the base station and the base station may transmit/receive radio signals to/from each other through the wireless communication/connections 150*a*, 150*b*, and 150*c*. For example, the wireless communication/connections 150*a*, 150*b*, and 150*c* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Meanwhile, NR supports multiple numerology (or subcarrier spacing (SCS)) to support various 5G services. For example, when SCS is 15 kHz, it supports a wide area in traditional cellular bands, and when SCS is 30 kHz/60 kHz, it supports dense-urban, lower latency, and wider carrier bandwidth, when SCS is 60 kHz or higher, it supports bandwidth greater than 24.25 GHz to overcome phase noise.

The NR frequency band can be defined as two types of frequency ranges (FR1, FR2). The values of the frequency range may be changed, for example, and the frequency ranges of the two types (FR1, FR2) may be as shown in Table 5 below. For convenience of explanation, among the frequency ranges used in the NR system, FR1 may mean "sub 6 GHz range", and FR2 may mean "above 6 GHz range" and may be called millimeter wave (mmW).

TABLE 5

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As described above, the numerical value of the frequency range of the NR system can be changed. For example, FR1 may include a band of 410 MHz to 7125 MHz as shown in Table 6 below. That is, FR1 may include a frequency band of 6 GHz (or 5850, 5900, 5925 MHz, etc.). For example, the frequency band above 6 GHz (or 5850, 5900, 5925 MHz, etc.) included within FR1 may include an unlicensed band. Unlicensed bands can be used for a variety of purposes, for example, for communications for vehicles (e.g., autonomous driving).

TABLE 6

| Frequency Range designation | Corresponding frequency range | Subcarrier Spacing |
|---|---|---|
| FR1 | 41 MHz-7125 MHz | 15, 30, 60 kHz |
| FR2 | 24250 MHz-52600 MHz | 60, 120, 240 kHz |

Wireless Device Applicable to the Present Disclosure

Examples of a wireless device to which various embodiments of the present disclosure are applied are described below.

FIG. 29 illustrates a wireless device applicable to various embodiments of the present disclosure.

Referring to FIG. 29, a first wireless device 100 and a second wireless device 200 may transmit and receive radio signals through various wireless access technologies (e.g., LTE and NR). {The first wireless device 100 and the second wireless device 200} may correspond to {the wireless device 100*x* and the base station 200} and/or {the wireless device 100*x* and the wireless device 100*x*} of FIG. 28.

The first wireless device 100 may include one or more processors 102 and one or more memories 104 and may further include one or more transceivers 106 and/or one or more antennas 108. The processor 102 may control the memory 104 and/or the transceiver 106 and may be configured to implement the descriptions, functions, procedures, proposals, methods and/or operation flowcharts described in the present disclosure. For example, the processor 102 may process information within the memory 104 to generate first information/signal, and then transmit a radio signal including the first information/signal through the transceiver 106. Further, the processor 102 may receive a radio signal including second information/signal through the transceiver 106, and then store in the memory 104 information obtained from signal processing of the second information/signal. The memory 104 may be connected to the processor 102 and store various information related to an operation of the processor 102. For example, the memory 104 may store software codes including instructions for performing all or some of processes controlled by the processor 102 or performing the descriptions, functions, procedures, proposals, methods and/or operation flowcharts described in the present disclosure. The processor 102 and the memory 104 may be a part of a communication modem/circuit/chip designed to implement the wireless communication technology (e.g., LTE and NR). The transceiver 106 may be connected to the processor 102 and may transmit and/or receive the radio signals via one or more antennas 108. The transceiver 106 may include a transmitter and/or a receiver. The transceiver 106 may be used interchangeably with a radio frequency (RF) unit. In various embodiments of the present disclosure, the wireless device may mean the communication modem/circuit/chip.

The second wireless device 200 may include one or more processors 202 and one or more memories 204 and may further include one or more transceivers 206 and/or one or more antennas 208. The processor 202 may control the memory 204 and/or the transceiver 206 and may be configured to implement the descriptions, functions, procedures, proposals, methods and/or operation flowcharts described in the present disclosure. For example, the processor 202 may process information within the memory 204 to generate third information/signal and then transmit a radio signal including the third information/signal through the transceiver 206. Further, the processor 202 may receive a radio signal including fourth information/signal through the transceiver 206 and then store in the memory 204 information obtained from signal processing of the fourth information/signal. The memory 204 may be connected to the processor 202 and store various information related to an operation of the processor 202. For example, the memory 204 may store software codes including instructions for performing all or some of processes controlled by the processor 202 or performing the descriptions, functions, procedures, proposals, methods and/or operation flowcharts described in the present disclosure. The processor 202 and the memory 204 may be a part of a communication modem/circuit/chip designated to implement the wireless communication technology (e.g., LTE and NR). The transceiver 206 may be connected to the processor 202 and may transmit and/or receive the radio signals through one or more antennas 208. The transceiver 206 may include a transmitter and/or a receiver, and the transceiver 206 may be used interchangeably with the RF unit. In various embodiments of the present disclosure, the wireless device may mean the communication modem/circuit/chip.

Hardware elements of the wireless devices 100 and 200 are described in more detail below. Although not limited thereto, one or more protocol layers may be implemented by one or more processors 102 and 202. For example, one or more processors 102 and 202 may implement one or more layers (e.g., functional layers such as PHY, MAC, RLC, PDCP, RRC, and SDAP). One or more processors 102 and 202 may generate one or more protocol data units (PDUs) and/or one or more service data units (SDUs) based on the descriptions, functions, procedures, proposals, methods and/or operation flowcharts described in the present disclosure. One or more processors 102 and 202 may generate messages, control information, data, or information based on the descriptions, functions, procedures, proposals, methods and/or operation flowcharts described in the present disclosure. One or more processors 102 and 202 may generate a signal (e.g., a baseband signal) including the PDU, the SDU, the messages, the control information, the data, or the information based on the functions, procedures, proposals and/or methods described in the present disclosure, and provide the generated signal to one or more transceivers 106 and 206. One or more processors 102 and 202 may receive the signal (e.g., baseband signal) from one or more transceivers 106 and 206 and acquire the PDU, the SDU, the messages, the control information, the data, or the information based on the descriptions, functions, procedures, proposals, methods and/or operation flowcharts described in the present disclosure.

One or more processors 102 and 202 may be referred to as a controller, a microcontroller, a microprocessor, or a microcomputer. One or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in one or more processors 102 and 202. The descriptions, functions, procedures, proposals, methods and/or operation flowcharts described in the present disclosure may be implemented using firmware or software, and the firmware or software may be implemented to include modules, procedures, functions, and the like. Firmware or software configured to perform the descriptions, functions, procedures, proposals, methods and/or operation flowcharts described in the present disclosure may be included in one or more processors 102 and 202 or stored in one or more memories 104 and 204 and may be executed by one or more processors 102 and 202. The descriptions, functions, procedures, proposals, methods and/or operation flowcharts described in the present disclosure may be implemented using firmware or software in the form of codes, instructions and/or a set form of instructions.

The one or more memories 104 and 204 may be connected to the one or more processors 102 and 202 and store various types of data, signals, messages, information, programs, codes, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located inside and/or outside the one or more processors 102 and 202. The one or more memories 104 and 204 may be connected to the one or more processors 102 and 202 through various technologies such as wired or wireless connection.

The one or more transceivers 106 and 206 may transmit, to one or more other devices, user data, control information, radio signals/channels, etc. mentioned in the methods and/or operation flowcharts of the present disclosure. The one or more transceivers 106 and 206 may receive, from the one or more other devices, the user data, control information, radio signals/channels, etc. mentioned in the descriptions, functions, procedures, proposals, methods and/or operation flowcharts described in the present disclosure. For example, the one or more transceivers 106 and 206 may be connected to the one or more processors 102 and 202 and transmit and receive radio signals. For example, the one or more processors 102 and 202 may control the one or more transceivers 106 and 206 to transmit the user data, control information, or radio signals to the one or more other devices. The one or more processors 102 and 202 may control the one or more transceivers 106 and 206 to receive the user data, control information, or radio signals from the one or more other devices. The one or more transceivers 106 and 206 may be connected to the one or more antennas 108 and 208, and the one or more transceivers 106 and 206 may be configured to transmit and receive over the one or more antennas 108 and 208 the user data, control information, radio signals/channels, etc. mentioned in the descriptions, functions, procedures, proposals, methods and/or operation flowcharts described in the present disclosure. In the present disclosure, the one or more antennas may be a plurality of physical antennas or a plurality of logical antennas (e.g., antenna ports). The one or more transceivers 106 and 206 may convert the received radio signals/channels etc. from RF band signals to baseband signals in order to process the received user data, control information, radio signals/channels, etc. using the one or more processors 102 and 202. The one or more transceivers 106 and 206 may convert the user data, control information, radio signals/channels, etc. processed using the one or more processors 102 and 202 from the baseband signals to the RF band signals. To this end, the one or more transceivers 106 and 206 may include (analog) oscillators and/or filters.

FIG. 30 illustrates another example of a wireless device applicable to various embodiments of the present disclosure.

Referring to FIG. 30, a wireless device may include at least one processor 102 and 202, at least one memory 104 and 204, at least one transceiver 106 and 206, and one or more antennas 108 and 208.

The wireless device illustrated in FIG. 29 is different from the wireless device illustrated in FIG. 30 in that the processors 102 and 202 and the memories 104 and 204 are separated from each other in FIG. 29, and the processors 102 and 202 include the memories 104 and 204 in FIG. 30.

Since the detailed description for the processors 102 and 202, the memories 104 and 204, the transceivers 106 and 206, and the one or more antennas 108 and 208 is the same as that described above, repetitive descriptions are omitted to avoid unnecessary repetition of description.

Examples of a signal processing circuit to which various embodiments of the present disclosure are applied are described below.

FIG. 31 illustrates a signal processing circuit for a transmission signal.

Referring to FIG. 31, a signal processing circuit 1000 may include scramblers 1010, modulators 1020, a layer mapper 1030, a precoder 1040, resource mappers 1050, and signal generators 1060. Although not limited to this, an operation/function of FIG. 31 may be performed by the processors 102 and 202 and/or the transceivers 106 and 206 of FIG. 29. Hardware elements of FIG. 31 may be implemented by the processors 102 and 202 and/or the transceivers 106 and 206 of FIG. 29. For example, blocks 1010 to 1060 may be implemented by the processors 102 and 202 of FIG. 29. Further, the blocks 1010 to 1050 may be implemented by the processors 102 and 202 of FIG. 29, and the block 1060 may be implemented by the transceivers 106 and 206 of FIG. 29.

Codewords may be converted into radio signals via the signal processing circuit 1000 of FIG. 31. The codewords are encoded bit sequences of information blocks. The information blocks may include transport blocks (e.g., a UL-SCH transport block, a DL-SCH transport block). The radio signals may be transmitted via various physical channels (e.g., PUSCH, PDSCH, etc.).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W, where N is the number of antenna ports, and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols, and the generated radio signals may be transmitted to other devices over each antenna. To this end, the signal generators 1060 may include inverse fast Fourier transform (IFFT) modules, cyclic prefix (CP) inserters, digital-to-analog converters (DACs), and frequency up-converters.

Signal processing procedures for a received signal in the wireless device may be configured in a reverse manner of the signal processing procedures 1010 to 1060 of FIG. 31. For example, the wireless devices (e.g., 100 and 200 of FIG. 29) may receive radio signals from the exterior through the antenna ports/transceivers. The received radio signals may be converted into baseband signals through signal restorers. To this end, the signal restorers may include frequency down-converters, analog-to-digital converters (ADCs), CP remover, and fast Fourier transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Examples of use of a wireless device to which various embodiments of the present disclosure are applied are described below.

FIG. 32 illustrates another example of a wireless device applied to various embodiments of the present disclosure. The wireless device may be implemented in various forms based on use cases/services (see FIG. 28).

Referring to FIG. 32, wireless devices 100 and 200 may correspond to the wireless devices 100 and 200 of FIG. 29 and may consist of various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 29. For example, the transceiver(s) 114 may include the one or more transceivers 106 and 206 and/or the one or more antennas 108 and 208 of FIG. 29. The control unit 120 is electrically connected to the communication unit 110, the memory 130, and the additional components 140 and controls overall operation of the wireless devices. For example, the control unit 120 may control an electric/mechanical operation of the wireless device based on programs/codes/instructions/information stored in the memory unit 130. The control unit 120 may transmit the information stored in the memory unit 130 to the exterior (e.g., other communication devices) through the communication unit 110 via a wireless/wired interface or store, in the memory unit 130, information received via the wireless/wired interface from the exterior (e.g., other communication devices) through the communication unit 110.

The additional components 140 may be variously configured based on types of wireless devices. For example, the additional components 140 may include at least one of a power unit/battery, input/output (I/O) unit, a driving unit, and a computing unit. The wireless device may be implemented in the form of the robot (100*a* of FIG. 28), the vehicles (100*b*-1 and 100*b*-2 of FIG. 28), the XR device (100*c* of FIG. 28), the hand-held device (100*d* of FIG. 28), the home appliance (100*e* of FIG. 28), the IoT device (100*f* of FIG. 28), a digital broadcast terminal, a hologram device, a public safety device, an MTC device, a medicine device, a fintech device (or a finance device), a security device, a climate/environment device, the AI server/device (400 of FIG. 28), the BSs (200 of FIG. 28), a network node, etc., but is not limited thereto. The wireless device may be used in a mobile or fixed place based on a use-example/service.

In FIG. 32, all the various elements, components, units/parts, and/or modules of the wireless devices 100 and 200 may be connected to each other via wired interfaces or at least a part thereof may be wirelessly connected through the communication unit 110. For example, in each of the wireless devices 100 and 200, the control unit 120 and the communication unit 110 may be connected by wire, and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may consist of a set of one or more processors. As an example, the control unit 120 may include a set of a communication control processor, an application processor, an electronic control unit (ECU), a graphical processing unit, and a memory control processor. As another example, the memory 130 may include a random access memory (RAM), a dynamic RAM (DRAM), a read only memory (ROM)), a flash memory, a volatile memory, a non-volatile memory, and/or a combination thereof.

Examples of implementation of FIG. 32 are described in more detail below.

FIG. 33 illustrates a hand-held device applied to various embodiments of the present disclosure. The hand-held device may include a smartphone, a smartpad, a wearable device (e.g., a smartwatch or a smartglasses), or a portable computer (e.g., a notebook). The mobile device may be referred to as a mobile station (MS), a user terminal (UT), a mobile subscriber station (MSS), a subscriber station (SS), an advanced mobile station (AMS), or a wireless terminal (WT).

Referring to FIG. 33, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 32, respectively.

The communication unit 110 may transmit and receive signals (e.g., data and control signals) to and from other wireless devices or BSs. The control unit 120 may perform various operations by controlling components of the hand-held device 100. The control unit 120 may include an application processor (AP). The memory unit 130 may store data/parameters/programs/codes/instructions needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, for data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

FIG. 34 illustrates a vehicle or an autonomous vehicle applied to various embodiments of the present disclosure.

The vehicle or autonomous vehicle may be implemented by a mobile robot, a car, a train, a manned/unmanned Aerial Vehicle (AV), a ship, etc.

Referring to FIG. 34, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 32, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an electronic control unit (ECU). The driving unit 140*a* may allow the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* so that the vehicle or the autonomous vehicle 100 moves along the autonomous driving path based on the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transmit information on a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

FIG. 35 illustrates a vehicle applied to various embodiments of the present disclosure. The vehicle may be implemented as a transport means, a train, an aerial vehicle, a ship, etc.

Referring to FIG. 35, a vehicle 100 may include a communication unit 110, a control unit 120, a memory unit 130, an I/O unit 140*a*, and a positioning unit 140*b*. The blocks 110 to 130/140*a* and 140*b* correspond to blocks 110 to 130/140 of FIG. 32, respectively.

The communication unit 110 may transmit and receive signals (e.g., data and control signals) to and from external devices such as other vehicles or base stations. The control unit 120 may perform various operations by controlling components of the vehicle 100. The memory unit 130 may store data/parameters/programs/codes/instructions for supporting various functions of the vehicle 100. The I/O unit 140*a* may output an AR/VR object based on information within the memory unit 130. The I/O unit 140*a* may include an HUD. The positioning unit 140*b* may acquire location information of the vehicle 100. The location information may include absolute location information of the vehicle 100, location information of the vehicle 100 within a traveling lane, acceleration information, and location information of the vehicle 100 from a neighboring vehicle. The positioning unit 140*b* may include a GPS and various sensors.

As an example, the communication unit 110 of the vehicle 100 may receive map information and traffic information from an external server and store the received information in the memory unit 130. The positioning unit 140*b* may obtain vehicle location information through the GPS and the various sensors and store the obtained information in the memory unit 130. The control unit 120 may generate a virtual object based on the map information, the traffic information, and the vehicle location information, and the I/O unit 140*a* may display the generated virtual object on a window in the vehicle (1410 and 1420). The control unit 120 may determine whether the vehicle 100 normally drives within a traveling lane, based on the vehicle location information. If the vehicle 100 abnormally exits from the traveling lane, the control unit 120 may display a warning on the window in the vehicle through the I/O unit 140*a*. In addition, the control unit 120 may broadcast a warning message about driving abnormity to neighboring vehicles through the communication unit 110. According to situations, the control unit 120 may transmit the location information of the vehicle and the information about driving/vehicle abnormality to related organizations through the communication unit 110.

FIG. 36 illustrates an XR device applied to various embodiments of the present disclosure. The XR device may be implemented as an HMD, a head-up display (HUD) mounted in a vehicle, a television, a smartphone, a computer, a wearable device, a home appliance, a digital signage, a vehicle, a robot, etc.

Referring to FIG. 36, an XR device 100*a* may include a communication unit 110, a control unit 120, a memory unit 130, an I/O unit 140*a*, a sensor unit 140*b*, and a power supply unit 140*c*. The blocks 110 to 130/140*a* to 140*c* correspond to the blocks 110 to 130/140 of FIG. 32, respectively.

The communication unit 110 may transmit and receive signals (e.g., media data, control signal, etc.) to and from external devices such as other wireless devices, handheld devices, or media servers. The media data may include video, images, sound, etc. The control unit 120 may control components of the XR device 100*a* to perform various operations. For example, the control unit 120 may be configured to control and/or perform procedures such as video/image acquisition, (video/image) encoding, and metadata generation and processing. The memory unit 120 may store data/parameters/programs/codes/instructions required to drive the XR device 100*a*/generate an XR object. The I/O unit 140*a* may obtain control information, data, etc. from the outside and output the generated XR object. The I/O unit 140*a* may include a camera, a microphone, a user input unit, a display, a speaker, and/or a haptic module. The sensor unit 140*b* may obtain a state, surrounding environment information, user information, etc. of the XR device 100*a*. The sensor 140*b* may include a proximity sensor, an illumination sensor, an acceleration sensor, a magnetic sensor, a gyro sensor, an inertial sensor, an RGB sensor, an IR sensor, a fingerprint scan sensor, an ultrasonic sensor, a light sensor, a microphone, and/or a radar. The power supply unit 140*c* may supply power to the XR device 100*a* and include a wired/wireless charging circuit, a battery, etc.

For example, the memory unit 130 of the XR device 100*a* may include information (e.g., data) required to generate the XR object (e.g., an AR/VR/MR object). The I/O unit 140*a* may obtain instructions for manipulating the XR device 100*a* from a user, and the control unit 120 may drive the XR device 100*a* based on a driving instruction of the user. For example, if the user desires to watch a film, news, etc. through the XR device 100*a*, the control unit 120 may transmit content request information to another device (e.g., a handheld device 100*b*) or a media server through the communication unit 110. The communication unit 110 may download/stream content such as films and news from another device (e.g., the handheld device 100*b*) or the media server to the memory unit 130. The control unit 120 may control and/or perform procedures, such as video/image acquisition, (video/image) encoding, and metadata generation/processing, for the content and generate/output the XR object based on information about a surrounding space or a real object obtained through the I/O unit 140*a*/sensor unit 140*b*.

The XR device 100*a* may be wirelessly connected to the handheld device 100*b* through the communication unit 110, and the operation of the XR device 100*a* may be controlled by the handheld device 100*b*. For example, the handheld device 100*b* may operate as a controller of the XR device 100*a*. To this end, the XR device 100*a* may obtain 3D location information of the handheld device 100*b* and generate and output an XR object corresponding to the handheld device 100*b*.

FIG. 37 illustrates a robot applied to various embodiments of the present disclosure. The robot may be categorized into an industrial robot, a medical robot, a household robot, a military robot, etc., based on a used purpose or field.

Referring to FIG. 37, a robot 100 may include a communication unit 110, a control unit 120, a memory unit 130, an I/O unit 140*a*, a sensor unit 140*b*, and a power supply unit 140*c*. The blocks 110 to 130/140*a* to 140*c* correspond to the blocks 110 to 130/140 of FIG. 32, respectively.

The communication unit 110 may transmit and receive signals (e.g., driving information and control signals) to and from external devices such as other wireless devices, other robots, or control servers. The control unit 120 may perform various operations by controlling components of the robot 100. The memory unit 130 may store data/parameters/programs/codes/instructions for supporting various functions of the robot 100. The I/O unit 140*a* may obtain information from the outside of the robot 100 and output information to the outside of the robot 100. The I/O unit 140*a* may include a camera, a microphone, a user input unit, a display unit, a speaker, and/or a haptic module. The sensor unit 140*b* may obtain internal information of the robot 100, surrounding environment information, user information, etc. The sensor unit 140*b* may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140*c* may perform various physical operations such as movement of robot joints. In addition, the driving unit 140*c* may allow the robot 100 to travel on the road or to fly. The driving unit 140*c* may include an actuator, a motor, a wheel, a brake, a propeller, etc.

FIG. 38 illustrates an AI device applied to various embodiments of the present disclosure.

The AI device may be implemented as a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 38, an AI device 100 may include a communication unit 110, a control unit 120, a memory unit 130, an input unit 140*a*, an out unit 140*b*, a learning processor unit 140*c*, and a sensor unit 140*d*. The blocks 110 to 130/140*a* to 140*d* correspond to the blocks 110 to 130/140 of FIG. 32, respectively.

The communication unit 110 may transmit and receive wired/radio signals (e.g., sensor information, user input, learning models, or control signals) to and from external devices such as other AI devices (e.g., 100*x*, 200, or 400 of FIG. 27) or an AI server 200 using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling components of the AI device 100. For example, the control unit 120 may request, search, receive, or use data of the learning processor unit 140*c* or the memory unit 130 and control the components of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140*c* or transmit the collected information to an external device such as an AI server (400 of FIG. 27). The collected history information may be used to update a learning model.

The memory unit 130 may store data for supporting various functions of the AI device 100. For example, the memory unit 130 may store data obtained from the input unit 140*a*, data obtained from the communication unit 110, output data of the learning processor unit 140*c*, and data obtained from the sensor unit 140. The memory unit 130 may store control information and/or software code needed to operate/drive the control unit 120.

The input unit 140*a* may acquire various types of data from the exterior of the AI device 100. For example, the input unit 140*a* may acquire learning data for model learning, and input data to which the learning model is to be applied. The input unit 140*a* may include a camera, a microphone, and/or a user input unit. The output unit 140*b* may generate output related to a visual, auditory, or tactile sense. The output unit 140*b* may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140*c* may learn a model consisting of artificial neural networks, using learning data. The learning processor unit 140*c* may perform AI processing together with the learning processor unit of the AI server (400 of FIG. 27). The learning processor unit 140*c* may process information received from an external device through the communication unit 110 and/or information stored in the memory unit 130. In addition, an output value of the learning processor unit 140*c* may be transmitted to the external device through the communication unit 110 and may be stored in the memory unit 130.

The claims described in various embodiments of the present disclosure can be combined in various ways. For example, technical features of the method claims of various embodiments of the present disclosure can be combined and implemented as a device, and technical features of the device claims of various embodiments of the present disclosure can be combined and implemented as a method. In addition, the technical features of the method claims and the technical features of the device claims in various embodiments of the present disclosure can be combined and implemented as a device, and the technical features of the method claims and the technical features of the device claims in various embodiments of the present disclosure can be combined and implemented as a method.

The invention claimed is:

1. An operation method of a first node in a quantum communication system, comprising:

receiving a checking sequence from a second node through a first quantum channel, wherein the checking sequence and a message coding sequence constitute entangled photon pairs (Einstein-Podolsky-Rosen pairs (EPR-pairs));

without storing the checking sequence in a quantum memory, performing a first single photon detection based on first basis information with respect to a part corresponding to a randomly selected first position in the checking sequence, to determine a first measurement value;

storing the first position, the first basis information, and information of the first measurement value in a general memory;

transmitting the first position, the first basis information, and the information of the first measurement value to the second node through a first classical channel;

receiving, through a second quantum channel, the message coding sequence in which classical message information comprising 1-bit is encoded;

performing a second single photon detection based on the first basis information with respect to a part corresponding to the first position in the message coding sequence; and detecting the classical message information based on whether a second measurement value and the first measurement value stored in the general memory match.

2. The method of claim 1, wherein the message coding sequence is received based on a safety of the checking sequence being confirmed from a first quantum bit error rate (QBER) for the first measurement value.

3. The method of claim 1, further comprising:

determining a second quantum bit error rate (QBER) based on the first measurement value and the second measurement value; and performing restoration of the classical message information through error correction based on the second QBER.

4. The method of claim 1, wherein the classical message information is encoded based on whether a polarization state of the message coding sequence is converted through a unitary operation.

5. The method of claim 1, wherein the checking sequence and the message coding sequence constituting an entangled quantum pair are generated by the second node, and wherein the checking sequence is generated by the second node and then received by the first node without conversion.

6. The method of claim 3, further comprising:

wherein the classical message information is encoded to the message coding sequence after mixing random classical binary information at random locations among the classical message information, receiving information of the random classical binary information and information of the random locations from the second node through a second classical channel, wherein the second QBER is measured further based on the information of the random classical binary information and information of the random locations.

7. The method of claim 1, wherein the general memory is configured to store information in a binary state, and wherein the quantum memory is configured to store information in a quantum state.

8. A first node in a quantum communication system, comprising:

a general memory;

a transceiver; and at least one processor, wherein at least one processor is configured to;

receive a checking sequence from a second node through a first quantum channel, wherein the checking sequence and a message coding sequence constitute entangled photon pairs (Einstein-Podolsky-Rosen pairs (EPR-pairs)), perform, without storing the checking sequence in a quantum memory, a first single photon detection based on first basis information with respect to a part corresponding to a randomly selected first position in the checking sequence, to determine a first measurement value, store the first position, the first basis information, and information of the first measurement value in a general memory, transmit the first position, the first basis information, and the information of the first measurement value to the second node through a first classical channel, receive, through a second quantum channel, the message coding sequence in which classical message information comprising 1-bit is encoded, perform a second single photon detection based on the first basis information with respect to a part corresponding to the first position in the message coding sequence, and detect the classical message information based on whether a second measurement value and the first measurement value stored in the general memory match.

9. The first node of claim 8, wherein the message coding sequence is received based on a safety of the checking sequence being confirmed from a first quantum bit error rate (QBER) for the first measurement value.

10. The first node of claim 8, wherein at least one processor is further configured to;

determine a second quantum bit error rate (QBER) based on the first measurement value and the second measurement value, and perform restoration of the classical message information through error correction based on the second QBER.

11. The first node of claim 8, wherein the classical message information is encoded based on whether a polarization state of the message coding sequence is converted through a unitary operation.

12. The first node of claim 8, wherein the checking sequence and the message coding sequence constituting an entangled quantum pair are generated by the second node, and wherein the checking sequence is generated by the second node and then received by the first node without conversion.

13. The first node of claim 10, wherein the classical message information is encoded to the message coding sequence after mixing random classical binary information at random locations among the classical message information, wherein the at least one processor is further configured to receive information of the random classical binary information and information of the random locations from the second node through a second classical channel, and wherein the second QBER is measured further based on the information of the random classical binary information and information of the random locations.

14. The first node of claim 8, wherein the general memory is configured to store information in a binary state, and wherein the quantum memory is configured to store information in a quantum state.

15. One or more non-transitory computer-readable media storing one or more instructions, wherein the one or more instructions perform operations based on being executed by one or more processors, wherein the operations include:

receiving a checking sequence from a second node through a first quantum channel, wherein the checking sequence and a message coding sequence constitute entangled photon pairs (Einstein-Podolsky-Rosen pairs (EPR-pairs));

without storing the checking sequence in a quantum memory, performing a first single photon detection based on first basis information with respect to a part corresponding to a randomly selected first position in the checking sequence, to determine a first measurement value;

storing the first position, the first basis information, and information of the first measurement value in a general memory;

transmitting the first position, the first basis information, and the information of the first measurement value to the second node through a first classical channel;

receiving, through a second quantum channel, the message coding sequence in which classical message information comprising 1-bit is encoded;

performing a second single photon detection based on the first basis information with respect to a part corresponding to the first position in the message coding sequence; and detecting the classical message information based on whether a second measurement value and the first measurement value stored in the general memory match.

* * * * *